United States Patent
Chaturvedi et al.

(10) Patent No.: US 8,694,587 B2
(45) Date of Patent: Apr. 8, 2014

(54) SYSTEM AND METHOD FOR TRANSFERRING A CALL BRIDGE BETWEEN COMMUNICATION DEVICES

(75) Inventors: Sivakumar Chaturvedi, Allen, TX (US); Satish Gundabathula, Irving, TX (US); Rashmi Hiremath, Allen, TX (US)

(73) Assignee: Damaka, Inc., Richardson, TX (US)

( * ) Notice: Subject to any disclaimer, the term of this patent is extended or adjusted under 35 U.S.C. 154(b) by 50 days.

(21) Appl. No.: 13/109,637

(22) Filed: May 17, 2011

(65) Prior Publication Data

US 2012/0296964 A1    Nov. 22, 2012

(51) Int. Cl.
*G06F 15/16* (2006.01)

(52) U.S. Cl.
USPC .......................................... 709/204; 370/260

(58) Field of Classification Search
USPC .......... 370/260, 401, 352, 357; 709/209, 228, 709/227; 455/414.3
See application file for complete search history.

(56) References Cited

U.S. PATENT DOCUMENTS

| | | |
|---|---|---|
| 5,442,637 A | 8/1995 | Nguyen |
| 5,761,309 A | 6/1998 | Ohashi et al. |
| 5,790,637 A | 8/1998 | Johnson et al. |
| 5,889,762 A | 3/1999 | Pajuvirta et al. |
| 6,031,818 A | 2/2000 | Lo et al. |
| 6,141,687 A | 10/2000 | Blair |
| 6,202,084 B1 | 3/2001 | Kumar et al. |
| 6,219,638 B1 | 4/2001 | Padmanabhan et al. |
| 6,269,159 B1 * | 7/2001 | Cannon et al. ........... 379/202.01 |
| 6,311,150 B1 | 10/2001 | Ramaswamy et al. |
| 6,343,067 B1 | 1/2002 | Drottar et al. |
| 6,360,196 B1 | 3/2002 | Poznanski et al. |
| 6,438,376 B1 | 8/2002 | Elliott et al. |
| 6,473,425 B1 | 10/2002 | Bellaton et al. |
| 6,574,668 B1 | 6/2003 | Gubbi et al. |
| 6,741,691 B1 | 5/2004 | Ritter et al. |
| 6,766,373 B1 | 7/2004 | Beadle |
| 6,826,613 B1 | 11/2004 | Wang et al. |
| 6,836,765 B1 | 12/2004 | Sussman |
| 6,842,460 B1 | 1/2005 | Olkkonen et al. |
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |

(Continued)

FOREIGN PATENT DOCUMENTS

| | | | |
|---|---|---|---|
| EP | 1404082 A2 | 3/2004 | |
| EP | 1523199 A1 * | 4/2005 | ............... H04Q 3/00 |

(Continued)

OTHER PUBLICATIONS

PCT: International Preliminary Report on Patentability of PCT/US2008/075141; Mar. 9, 2010; 5 pgs.

(Continued)

*Primary Examiner* — Anh-Vu Ly
*Assistant Examiner* — Gustavo Lopez-Vargas
(74) *Attorney, Agent, or Firm* — Howison & Arnott, L.L.P.

(57) ABSTRACT

An improved system and method are disclosed for conference bridging. In one example, the method enables a device engaged in a conference call as a participant to bridge the conference call and to transfer the bridge to another device engaged in the conference call as a participant.

23 Claims, 20 Drawing Sheets

(56) References Cited

U.S. PATENT DOCUMENTS

| | | | |
|---|---|---|---|
| 6,963,555 | B1 | 11/2005 | Brenner et al. |
| 6,975,718 | B1 | 12/2005 | Pearce et al. |
| 6,987,756 | B1 | 1/2006 | Ravindranath et al. |
| 6,999,575 | B1 | 2/2006 | Sheinbein |
| 6,999,932 | B1 | 2/2006 | Zhou |
| 7,013,155 | B1 | 3/2006 | Ruf et al. |
| 7,079,529 | B1 | 7/2006 | Khuc |
| 7,080,158 | B1 | 7/2006 | Squire |
| 7,117,526 | B1 | 10/2006 | Short |
| 7,184,415 | B2 | 2/2007 | Chaney et al. |
| 7,272,377 | B2 | 9/2007 | Cox et al. |
| 7,304,985 | B2 | 12/2007 | Sojka et al. |
| 7,353,252 | B1 | 4/2008 | Yang et al. |
| 7,353,255 | B2 | 4/2008 | Acharya et al. |
| 7,412,374 | B1 | 8/2008 | Seiler et al. |
| 7,457,279 | B1 | 11/2008 | Scott et al. |
| 7,477,282 | B2 | 1/2009 | Firestone et al. |
| 7,512,652 | B1 | 3/2009 | Appelman et al. |
| 7,613,171 | B2 | 11/2009 | Zehavi et al. |
| 7,664,495 | B1 | 2/2010 | Bonner et al. |
| 7,778,187 | B2 | 8/2010 | Chaturvedi et al. |
| 7,920,853 | B2 * | 4/2011 | Purontaus et al. ............. 455/416 |
| 2002/0038282 | A1 | 3/2002 | Montgomery |
| 2002/0042769 | A1 | 4/2002 | Gujral et al. |
| 2002/0062285 | A1 | 5/2002 | Amann et al. |
| 2002/0080719 | A1 | 6/2002 | Parkvall et al. |
| 2002/0087887 | A1 | 7/2002 | Busam et al. |
| 2002/0097150 | A1 | 7/2002 | Sandelman et al. |
| 2002/0120757 | A1 | 8/2002 | Sutherland et al. |
| 2002/0141383 | A1 * | 10/2002 | Schaefer et al. .............. 370/352 |
| 2002/0143548 | A1 | 10/2002 | Korall et al. |
| 2002/0150110 | A1 | 10/2002 | Inbar et al. |
| 2002/0166053 | A1 | 11/2002 | Wilson |
| 2002/0173303 | A1 | 11/2002 | Shibutani |
| 2002/0176404 | A1 | 11/2002 | Girard |
| 2002/0178087 | A1 | 11/2002 | Henderson et al. |
| 2002/0184310 | A1 | 12/2002 | Traversat et al. |
| 2003/0009565 | A1 | 1/2003 | Arao |
| 2003/0031210 | A1 | 2/2003 | Harris |
| 2003/0035441 | A1 | 2/2003 | Cheng et al. |
| 2003/0044020 | A1 | 3/2003 | Aboba et al. |
| 2003/0046056 | A1 | 3/2003 | Godoy et al. |
| 2003/0061025 | A1 | 3/2003 | Abir |
| 2003/0061481 | A1 | 3/2003 | Levine et al. |
| 2003/0072485 | A1 | 4/2003 | Guerin et al. |
| 2003/0076815 | A1 | 4/2003 | Miller et al. |
| 2003/0078858 | A1 | 4/2003 | Angelopoulos et al. |
| 2003/0105812 | A1 | 6/2003 | Flowers, Jr. et al. |
| 2003/0110047 | A1 | 6/2003 | Santosuosso |
| 2003/0115251 | A1 | 6/2003 | Fredrickson et al. |
| 2003/0126213 | A1 | 7/2003 | Betzler |
| 2003/0135569 | A1 | 7/2003 | Khakoo et al. |
| 2003/0137939 | A1 | 7/2003 | Dunning et al. |
| 2003/0158722 | A1 | 8/2003 | Lord |
| 2003/0163525 | A1 | 8/2003 | Hendriks et al. |
| 2003/0163697 | A1 | 8/2003 | Pabla et al. |
| 2003/0174707 | A1 | 9/2003 | Grob et al. |
| 2003/0177186 | A1 | 9/2003 | Goodman et al. |
| 2003/0177422 | A1 | 9/2003 | Tararoukhine et al. |
| 2003/0187650 | A1 | 10/2003 | Moore et al. |
| 2003/0217171 | A1 | 11/2003 | Von Stuermer et al. |
| 2003/0220121 | A1 | 11/2003 | Konishi et al. |
| 2004/0005877 | A1 | 1/2004 | Vaananen |
| 2004/0034776 | A1 | 2/2004 | Fernando et al. |
| 2004/0034793 | A1 | 2/2004 | Yuan |
| 2004/0039781 | A1 | 2/2004 | LaVallee et al. |
| 2004/0044517 | A1 | 3/2004 | Palmquist |
| 2004/0100973 | A1 | 5/2004 | Prasad |
| 2004/0103212 | A1 | 5/2004 | Takeuchi et al. |
| 2004/0128554 | A1 | 7/2004 | Maher, III et al. |
| 2004/0133689 | A1 | 7/2004 | Vasisht |
| 2004/0139225 | A1 | 7/2004 | Takahashi |
| 2004/0139228 | A1 | 7/2004 | Takeda et al. |
| 2004/0143678 | A1 | 7/2004 | Chari et al. |
| 2004/0153858 | A1 | 8/2004 | Hwang |
| 2004/0158471 | A1 | 8/2004 | Davis et al. |
| 2004/0162871 | A1 | 8/2004 | Pabla et al. |
| 2004/0203834 | A1 | 10/2004 | Mahany |
| 2004/0228279 | A1 | 11/2004 | Midtun et al. |
| 2004/0249953 | A1 | 12/2004 | Fernandez et al. |
| 2004/0260952 | A1 | 12/2004 | Newman et al. |
| 2004/0267527 | A1 | 12/2004 | Creamer et al. |
| 2004/0267938 | A1 | 12/2004 | Shoroff et al. |
| 2004/0268257 | A1 | 12/2004 | Mudusuru |
| 2005/0004982 | A1 | 1/2005 | Vernon et al. |
| 2005/0008024 | A1 | 1/2005 | Newpol et al. |
| 2005/0033985 | A1 | 2/2005 | Xu et al. |
| 2005/0050227 | A1 | 3/2005 | Michelman |
| 2005/0071481 | A1 | 3/2005 | Danieli |
| 2005/0086309 | A1 | 4/2005 | Galli et al. |
| 2005/0091407 | A1 | 4/2005 | Vaziri et al. |
| 2005/0105524 | A1 | 5/2005 | Stevens et al. |
| 2005/0119005 | A1 | 6/2005 | Segal et al. |
| 2005/0136911 | A1 | 6/2005 | Csapo et al. |
| 2005/0138119 | A1 | 6/2005 | Saridakis |
| 2005/0143105 | A1 | 6/2005 | Okamoto |
| 2005/0187957 | A1 | 8/2005 | Kramer et al. |
| 2005/0195802 | A1 | 9/2005 | Klein et al. |
| 2005/0246193 | A1 | 11/2005 | Roever et al. |
| 2005/0249196 | A1 | 11/2005 | Ansari et al. |
| 2005/0254440 | A1 | 11/2005 | Sorrell |
| 2005/0286519 | A1 | 12/2005 | Ravikumar et al. |
| 2006/0002355 | A1 | 1/2006 | Baek et al. |
| 2006/0121986 | A1 | 6/2006 | Pelkey et al. |
| 2006/0148516 | A1 | 7/2006 | Reddy et al. |
| 2006/0168643 | A1 | 7/2006 | Howard et al. |
| 2006/0183476 | A1 | 8/2006 | Morita et al. |
| 2006/0218624 | A1 | 9/2006 | Ravikumar et al. |
| 2006/0230166 | A1 | 10/2006 | Philyaw |
| 2006/0246903 | A1 | 11/2006 | Kong et al. |
| 2007/0016921 | A1 | 1/2007 | Levi et al. |
| 2007/0078785 | A1 | 4/2007 | Bush et al. |
| 2007/0110043 | A1 | 5/2007 | Girard |
| 2007/0111794 | A1 | 5/2007 | Hogan et al. |
| 2007/0190987 | A1 | 8/2007 | Vaananen |
| 2008/0005328 | A1 | 1/2008 | Shively et al. |
| 2008/0032695 | A1 | 2/2008 | Zhu et al. |
| 2008/0069105 | A1 | 3/2008 | Costa et al. |
| 2008/0192756 | A1 | 8/2008 | Damola et al. |
| 2008/0320096 | A1 | 12/2008 | Szeto |
| 2009/0086952 | A1 * | 4/2009 | Geppert et al. .......... 379/204.01 |
| 2009/0192976 | A1 | 7/2009 | Spivack et al. |
| 2009/0240821 | A1 | 9/2009 | Juncker et al. |
| 2010/0279670 | A1 * | 11/2010 | Ghai et al. ................ 455/414.3 |
| 2011/0038362 | A1 * | 2/2011 | Vos et al. ....................... 370/352 |
| 2011/0182212 | A1 * | 7/2011 | Smelyansky et al. ......... 370/260 |

FOREIGN PATENT DOCUMENTS

| | | |
|---|---|---|
| JP | 2005-94600 | 4/2005 |
| JP | 2007-043598 | 2/2007 |
| KR | 10-2005-0030548 | 3/2005 |
| WO | WO 2004/063843 | 7/2004 |
| WO | WO 2005/009019 | 1/2005 |
| WO | WO 03/079635 | 9/2005 |
| WO | WO 2006/075677 A1 | 7/2006 |

OTHER PUBLICATIONS

PCT: International Preliminary Report on Patentability of PCT/US2007/068820; Dec. 31, 2008; 8 pgs.

PCT: International Preliminary Report on Patentability of PCT/US2007/068823; Nov. 27, 2008; 8 pgs.

PCT: International Preliminary Report on Patentability of PCT/US2006/047841; Nov. 6, 2008; 7 pgs.

PCT: International Preliminary Report on Patentability of PCT/US2007/002424; Aug. 7, 2008; 6 pgs.

PCT: International Preliminary Report on Patentability of PCT/US2006/040312; May 2, 2008; 5 pgs.

PCT: International Preliminary Report on Patentability of PCT/IB2005/000821; Oct. 19, 2006; 10 pgs.

Chathapuram, "Security in Peer-To-Peer Networks", Aug. 8. 2001, XP002251813.

(56) References Cited

OTHER PUBLICATIONS

International Search Report and Written Opinion of the International Searching Authority from PCT/IB2005/000821, dated Aug. 5, 2005.
International Search Report and Written Opinion of the International Searching Authority from PCT/US2006//032791, dated Dec. 18, 2006.
International Search Report and Written Opinion of the International Searching Authority from PCT/US2006/040312, dated Mar. 2, 2007.
International Search Report and Written Opinion of the International Searching Authority from PCT/US2006/047841, dated Sep. 12, 2008.
International Search Report and Written Opinion of the International Searching Authority from PCT/US2007/002424, dated Aug. 14, 2007.
International Search Report and Written Opinion of the International Searching Authority from PCT/US2007/068820, dated Jun. 11, 2008.
International Search Report and Written Opinion of the International Searching Authority from PCT/US2007/068821, dated Jun. 14, 2008.
International Search Report and Written Opinion of the International Searching Authority from PCT/US2007068823, dated Jun. 1, 2008.
Jeff Tyson, "How Instant Messaging Works", www.verizon.com/learningcenter, Mar. 9, 2005.
Rory Bland, et al,"P2P Routing" Mar. 2002.
Rosenberg, "STUN- Simple Traversal of UDP Through NAT", Sep. 2002, XP015005058.
Salman A. Baset, et al, "An Analysis of The Skype Peer-To-Peer Internet Telephony Protocol", Department of Computer Science, Columbia University, New York, NY, USA, Sep. 15, 2004.
Singh et al., "Peer-to Peer Internet Telephony Using SIP", Department of Computer Science, Columbia University, Oct. 31, 2004, XP-002336408.
Sinha, S. and Oglieski, A., A TCP Tutorial, Nov. 1998 (Date posted on Internet: Apr. 19, 2001) [Retrieved from the Internet <URL:http//www.ssfnet.org/Exchange/tcp/tcpTutorialNotes.html>].
Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.
International Search Report and Written Opinion of the International Searching Authority from PCT/US2008/078142, dated Mar. 27, 2009.
International Search Report and Written Opinion of the International Searching Authority from PCT/US2008/084950, dated Apr. 27, 2009.
Hao Wang, Skype VoIP service-architecture and comparison, in: INFOTECH Seminar Advanced Communication Services (ASC), 2005, pp. 4, 7, 8.
Seta, N.; Miyajima, H.; Zhang, L;; Fujii, T., "All-SIP Mobility: Session Continuity on Handover in Heterogeneous Access Environment," Vehicular Technology Conference, 2007. VTC 2007-Spring. IEEE 65th, Apr. 22-25, 2007, pp. 1121-1126.
International Search Report and Written Opinion of the International Searching Authority from PCT/US2008/075141, dated Mar. 5, 2009.
Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.
Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.
PCT: International Preliminary Report on Patentability of PCT/US2008/084950; Jun. 1, 2010; 5 pgs.

\* cited by examiner

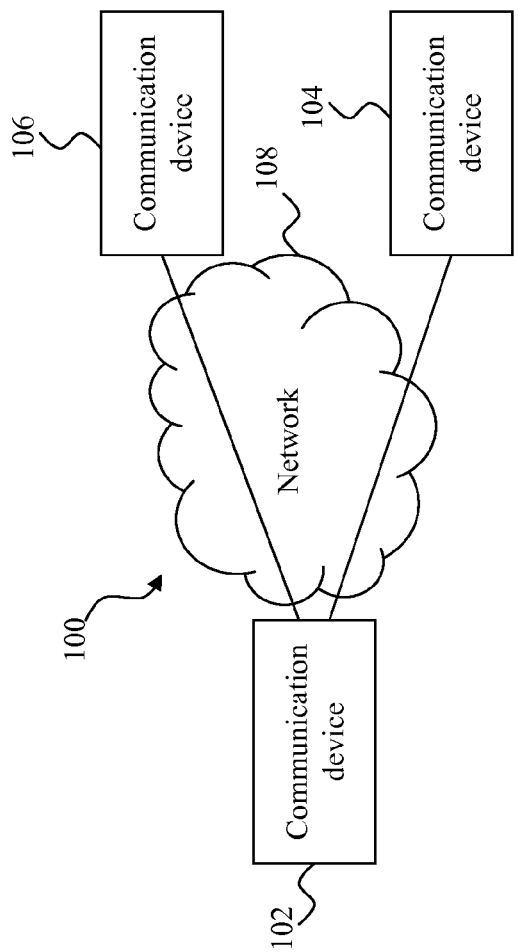
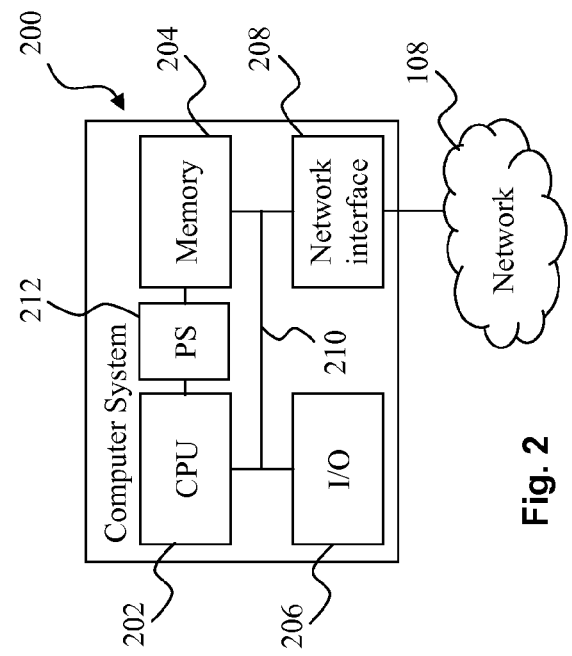

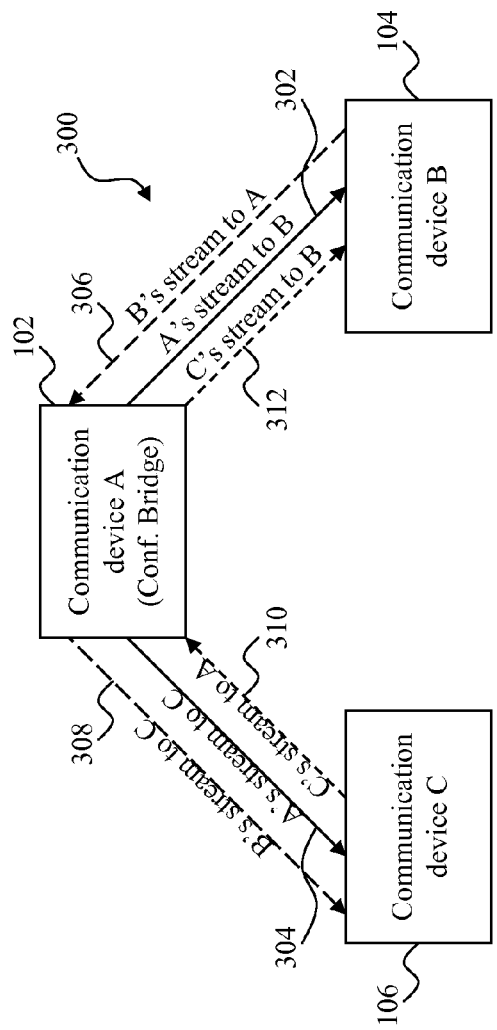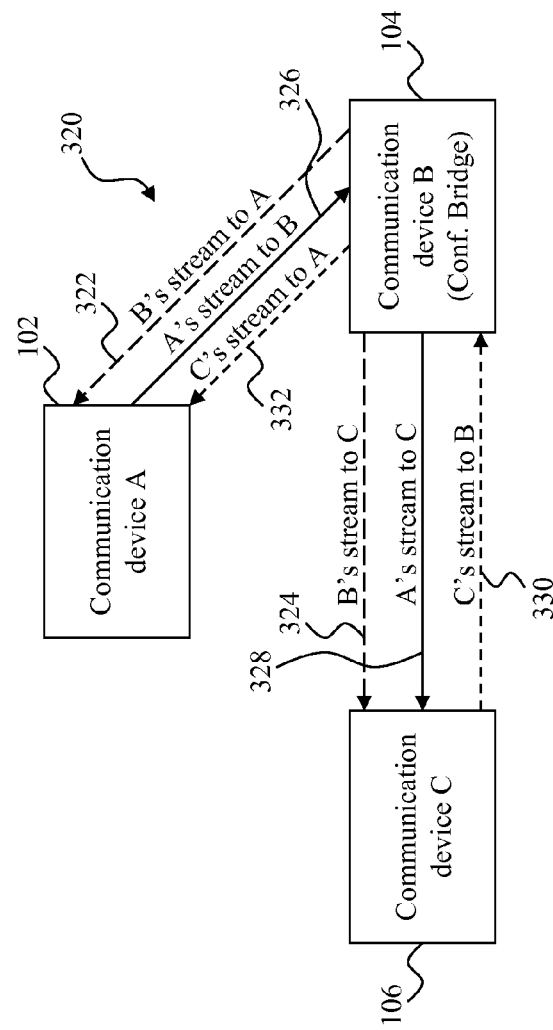

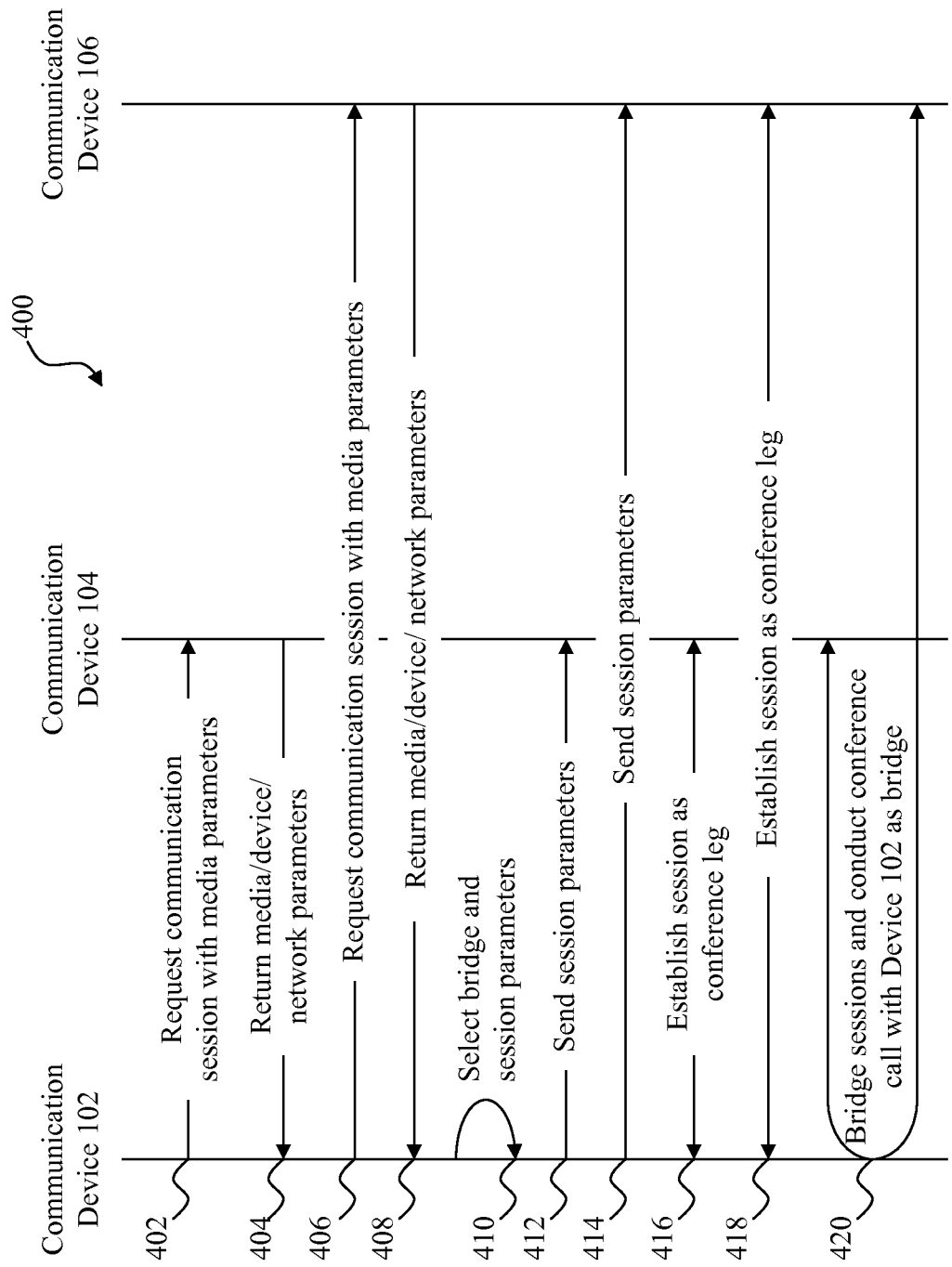

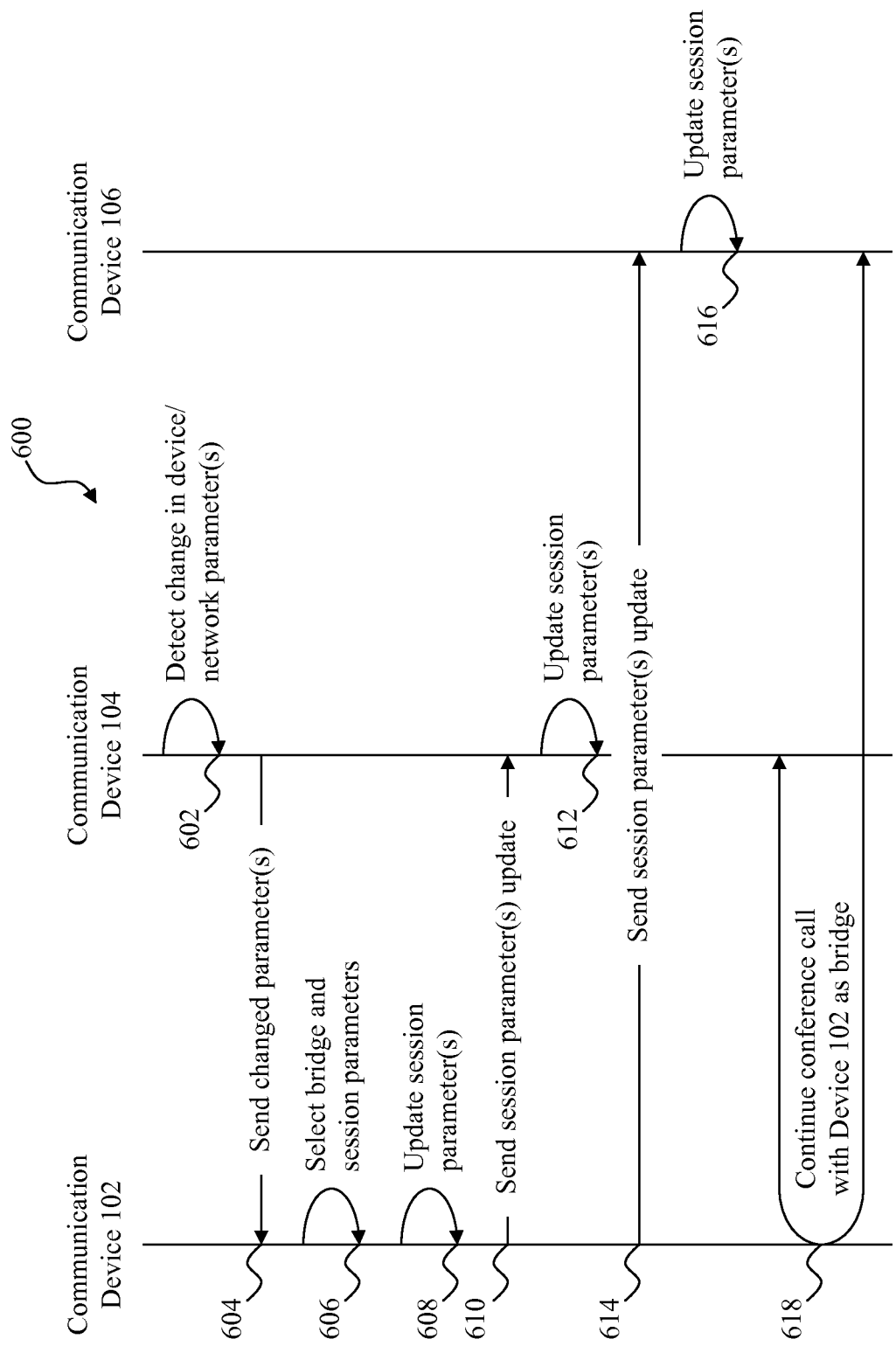

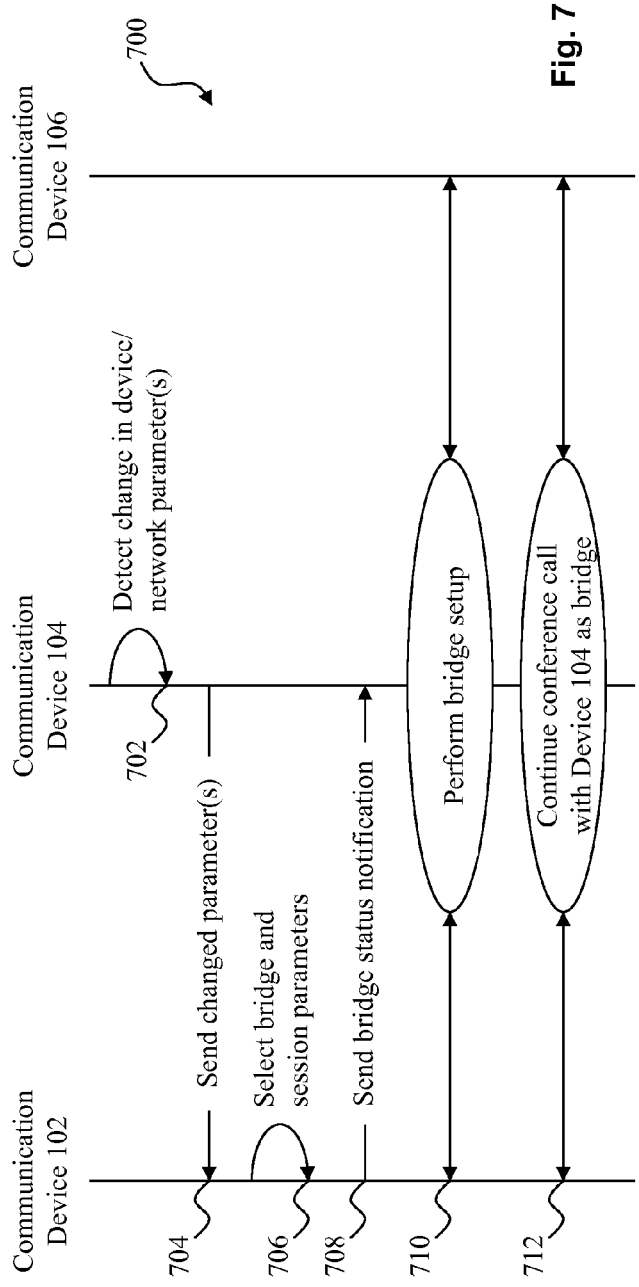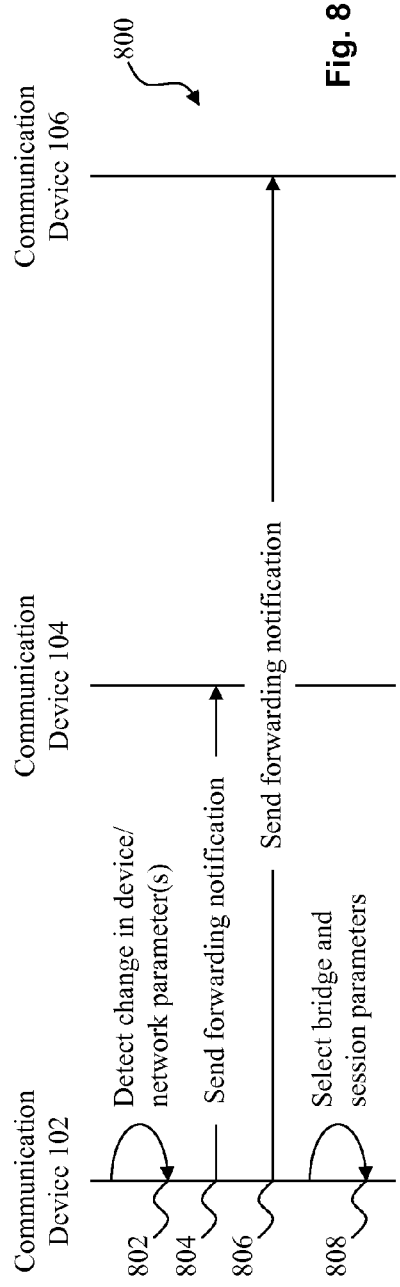

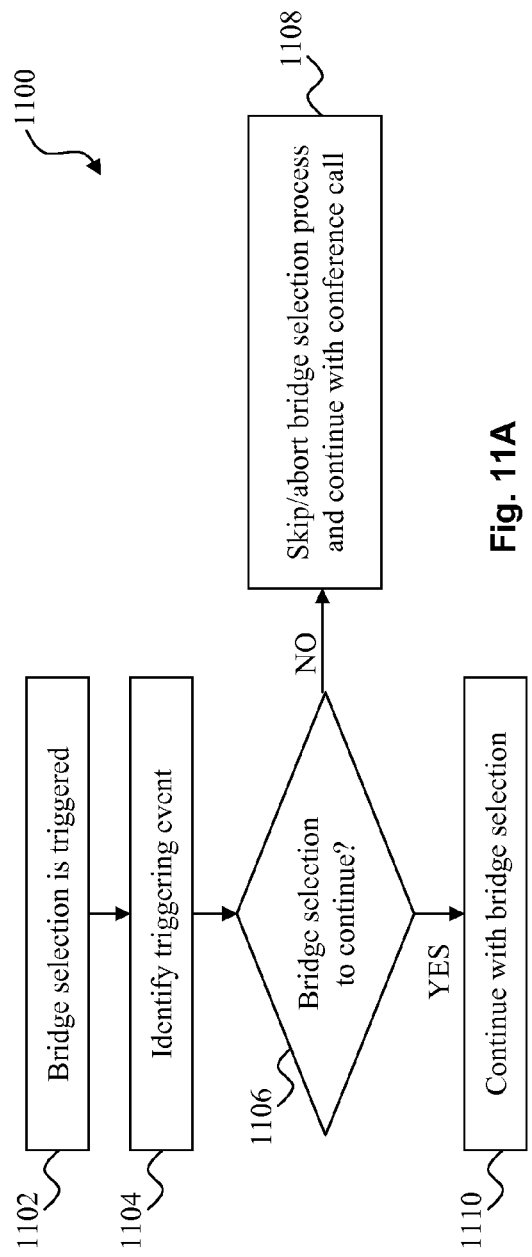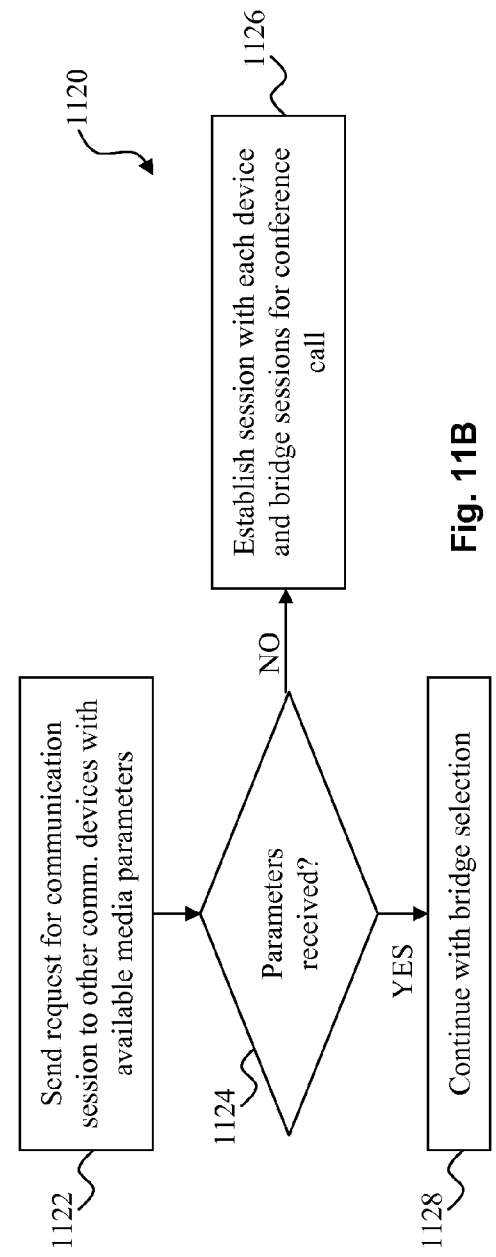

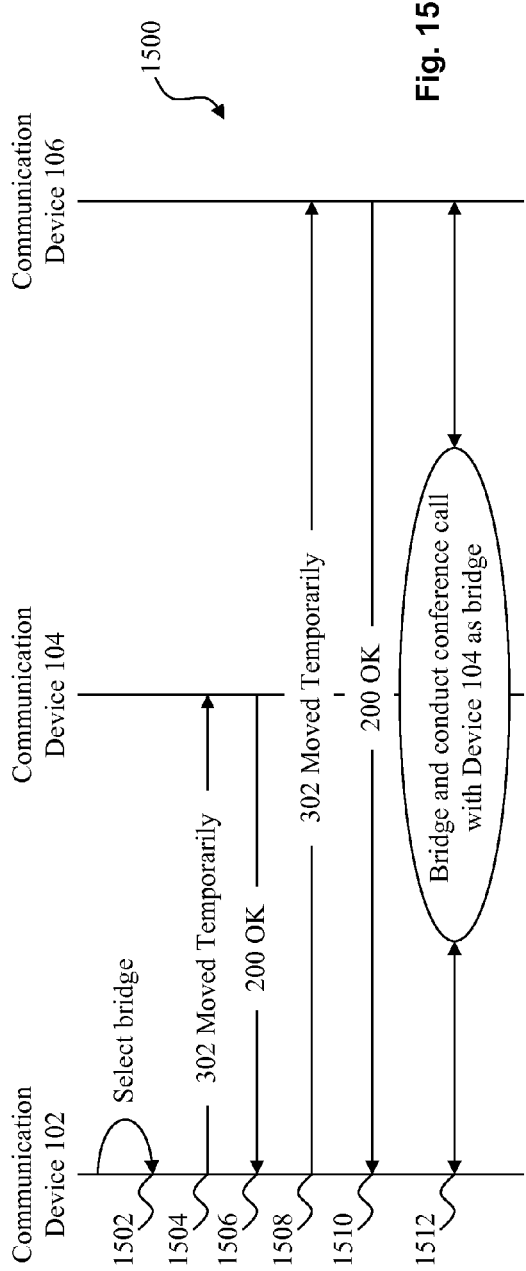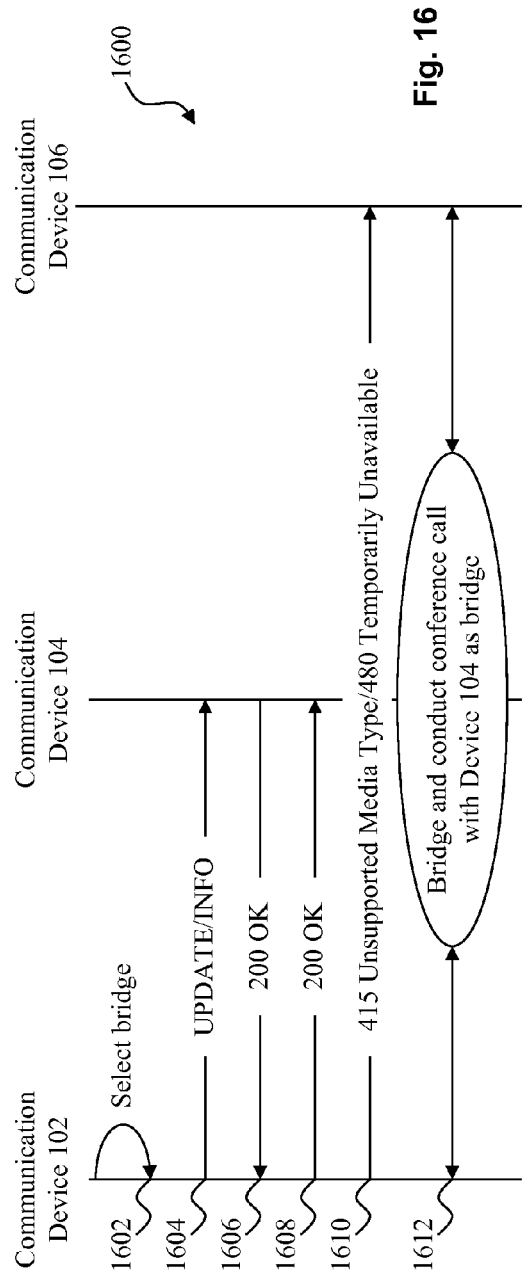

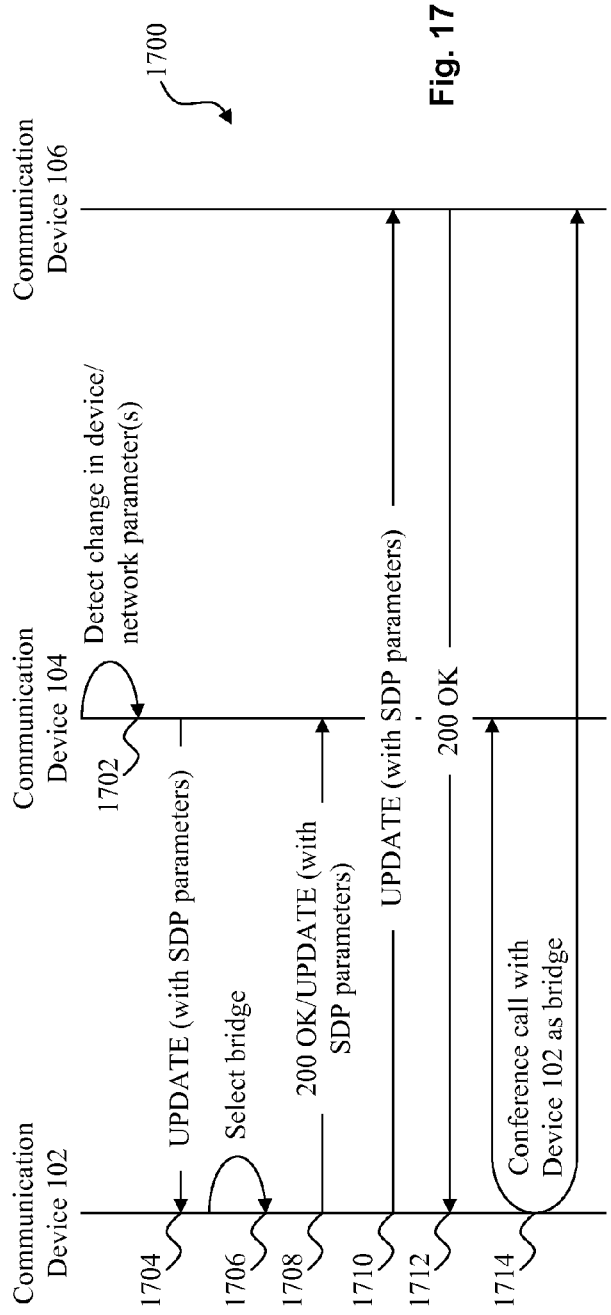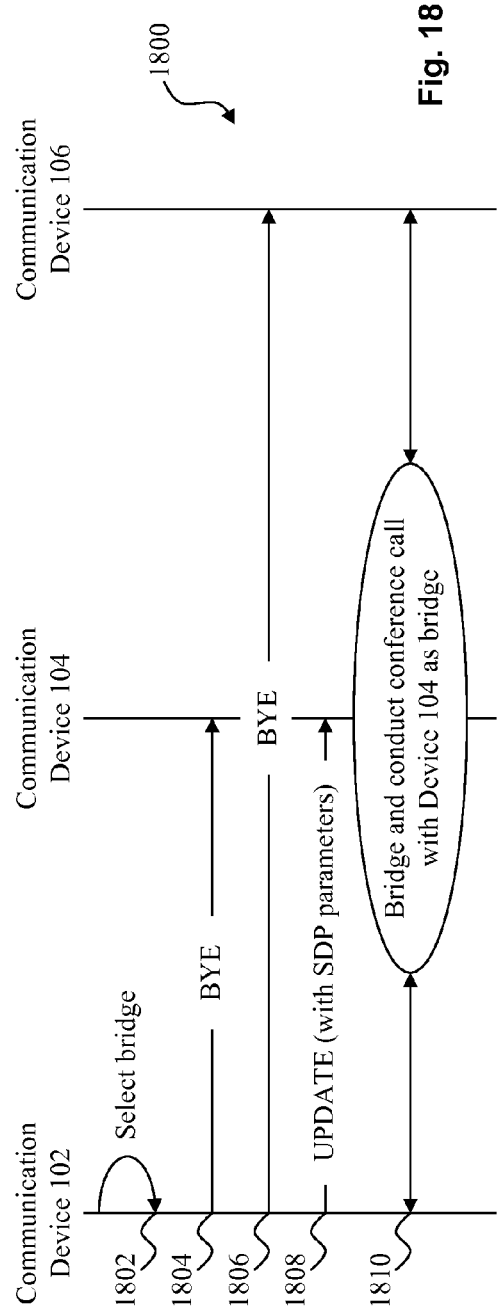

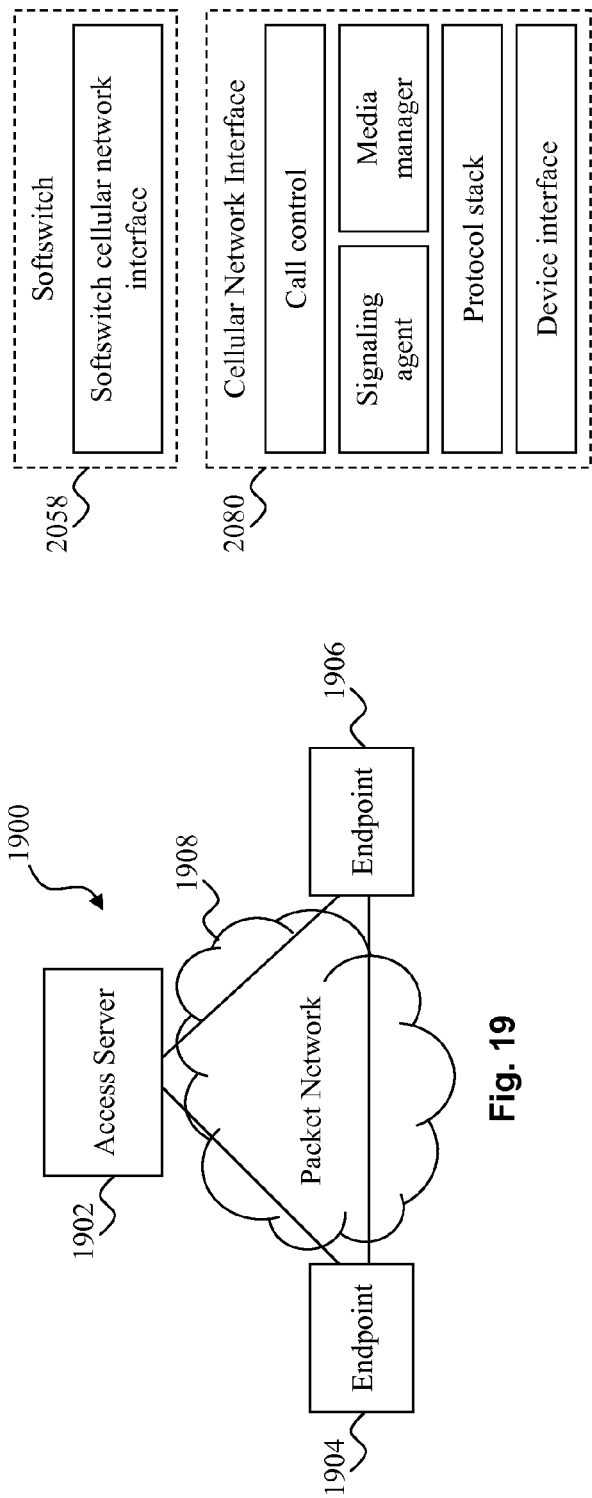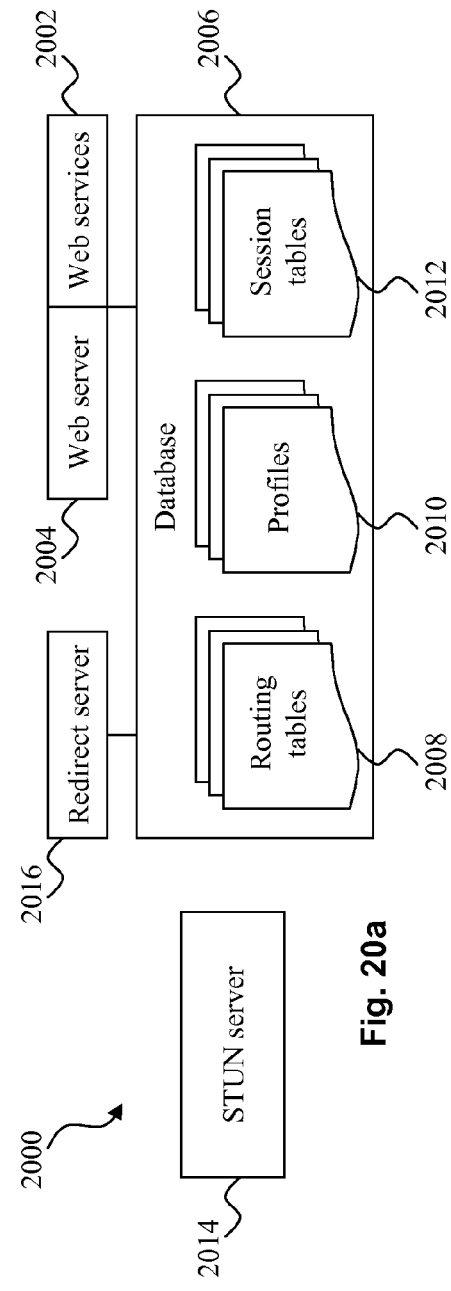

SYSTEM AND METHOD FOR TRANSFERRING A CALL BRIDGE BETWEEN COMMUNICATION DEVICES

INCORPORATION BY REFERENCE

This application incorporates by reference in their entirety U.S. Pat. No. 7,656,870, filed on Mar. 15, 2005, and entitled SYSTEM AND METHOD FOR PEER-TO-PEER HYBRID COMMUNICATIONS; U.S. Pat. No. 7,570,636, filed on Aug. 30, 2005, and entitled SYSTEM AND METHOD FOR TRAVERSING A NAT DEVICE FOR PEER-TO-PEER HYBRID COMMUNICATIONS; U.S. patent application Ser. No. 12/705,925, filed on Feb. 15, 2010, and entitled SYSTEM AND METHOD FOR STRATEGIC ROUTING IN A PEER-TO-PEER ENVIRONMENT; and U.S. patent application Ser. No. 12/749,251, filed on Mar. 29, 2010, and entitled SYSTEM AND METHOD FOR SESSION SWEEPING BETWEEN DEVICES.

BACKGROUND

Conference call technology generally relies on a dedicated component, such as a switch or a conference hub, to handle conference call bridging. However, such technology may be expensive and lacks flexibility. Accordingly, what is needed are a system and method that addresses these issues.

BRIEF DESCRIPTION OF THE DRAWINGS

For a more complete understanding, reference is now made to the following description taken in conjunction with the accompanying Drawings in which:

FIG. 1 is a simplified network diagram of one embodiment of an environment with three communication devices engaged in a conference call that is bridged on one of the devices.

FIG. 2 is a simplified diagram of one embodiment of a computer system that may be used as a communication device of FIG. 1.

FIG. 3A is a simplified diagram of an embodiment of a conference call message flow between the devices of FIG. 1 with one device as the bridge.

FIG. 3B is a simplified diagram of another embodiment of a conference call message flow between the devices of FIG. 1 after the bridge has been transferred to another of the devices.

FIG. 4 is a sequence diagram illustrating one embodiment of a process that may be executed by the devices of FIG. 1 to initiate a conference call and select one of the devices as the bridge.

FIG. 6 is a sequence diagram illustrating one embodiment of a process that may be executed by the devices of FIG. 1 when a change is detected in one of the device's device and/or network parameters and the device is not the bridge.

FIG. 7 is a sequence diagram illustrating one embodiment of another process that may be executed by the devices of FIG. 1 when a change is detected in one of the device's device and/or network parameters and the device is not the bridge.

FIG. 8 is a sequence diagram illustrating one embodiment of a process that may be executed by the devices of FIG. 1 when a change is detected in one of the device's device and/or network parameters and the device is the bridge.

FIG. 11A is a flow chart illustrating one embodiment of a method that may be executed by one of the devices of FIG. 1 to determine whether a bridge selection process should continue.

FIG. 11B is a flow chart illustrating one embodiment of a method that may be executed by one of the devices of FIG. 1 to determine whether the other devices have bridge functionality.

FIG. 15 is a sequence diagram illustrating one embodiment of a process that may be executed by the devices of FIG. 1 to transfer the bridge from one of the devices to another of the devices.

FIG. 16 is a sequence diagram illustrating one embodiment of another process that may be executed by the devices of FIG. 1 to transfer the bridge from one of the devices to another of the devices.

FIG. 17 is a sequence diagram illustrating one embodiment of a process that may be executed by the devices of FIG. 1 when a change is detected in one of the device's device and/or network parameters.

FIG. 18 is a sequence diagram illustrating one embodiment of another process that may be executed by the devices of FIG. 1 when a change is detected in one of the device's device and/or network parameters.

FIG. 19 is a simplified network diagram of one embodiment of a hybrid peer-to-peer system.

FIG. 20a illustrates one embodiment of an access server architecture that may be used within the system of FIG. 19.

FIG. 20c illustrates one embodiment of components within the endpoint architecture of FIG. 20b that may be used for cellular network connectivity.

DETAILED DESCRIPTION

Figure 5:
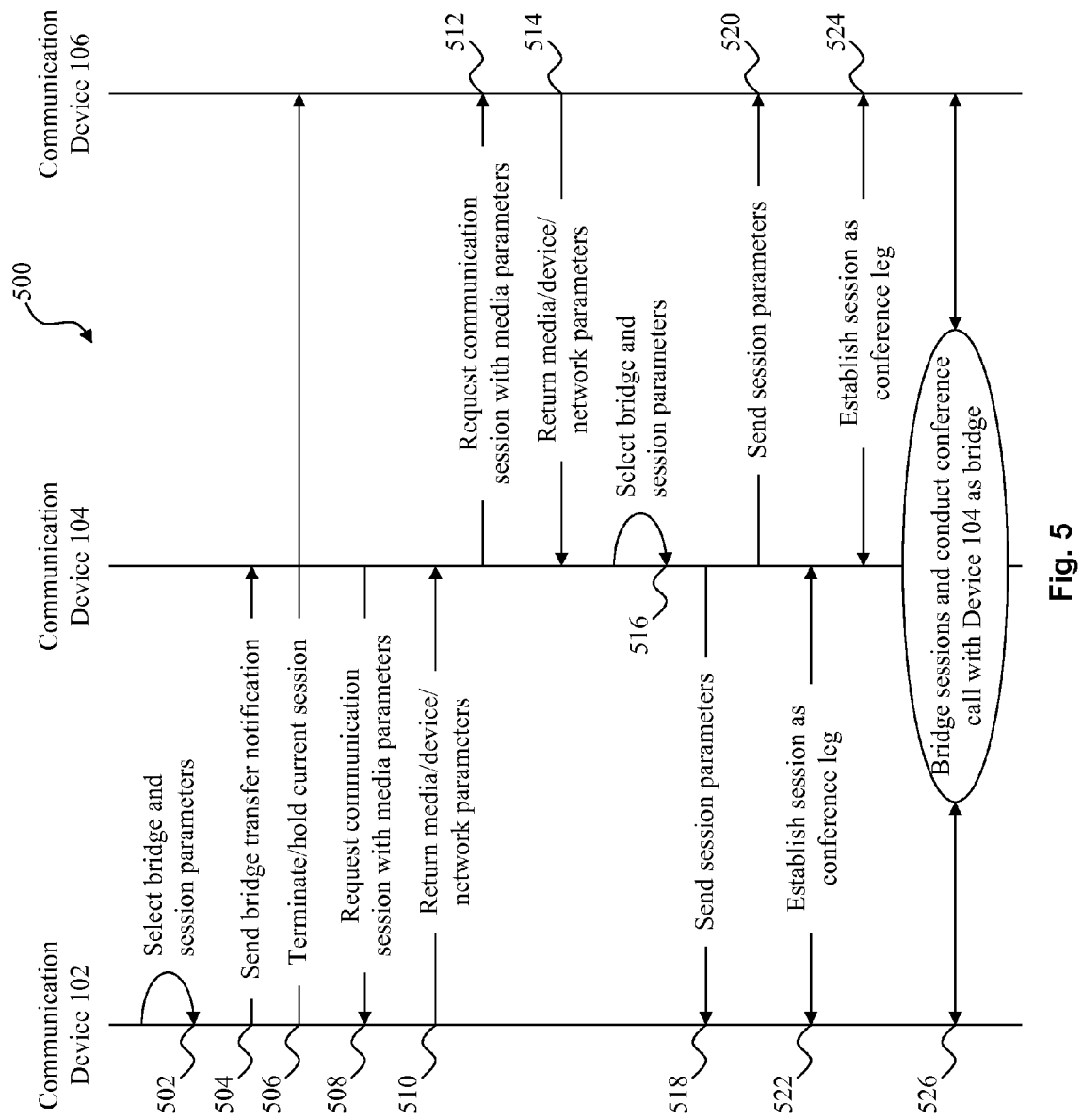
FIG. 5 is a sequence diagram illustrating one embodiment of a process that may be executed by the devices of FIG. 1 to transfer the bridge from one of the devices to another of the devices.

The present disclosure is directed to a system and method for conference call bridging. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, an environment 100 is illustrated with three communication devices 102, 104, and 106. Examples of such communication devices include cellular telephones (including smart phones), personal digital assistants (PDAs), netbooks, tablets, laptops, desktops, workstations, telepresence consoles, and any other computing device that can communicate with another computing device using a wireless and/or wireline communication link. Such communications may be direct (e.g., via a peer-to-peer network, an ad hoc network, or using a direct connection), indirect, such as through a server or other proxy (e.g., in a client-server model), or may use a combination of direct and indirect communications. Although only three devices 102, 104, and 106 are illustrated, it is understood that other devices may be present in FIG. 1.

The user of the device 102 wants to establish a conference call with the users of the devices 104 and 106. For purposes of example, the conference call is an audio/video call, but it is understood that it may be any type of call in which a call bridge is needed. Of the devices 102, 104, and 106, at least the device 102 has the ability to bridge the conference call itself. Accordingly, the device 102 is capable of establishing a communication session with the device 104, a communication session with the device 106, and then operate as a bridge to connect the two sessions for the conference call between the devices 102, 104, and 106.

As will be described below, one or both of the devices 104 and 106 may also be capable of functioning as a bridge for the conference call. In other words, each of the devices 102, 104, and 106 may include software and/or hardware that enable that device to establish and bridge a conference call while participating in the conference call. In such cases, the device 102 may transfer the bridge to one of the other devices 102 and 104.

The network 108 may be a single network or may represent multiple networks, including networks of different types. For example, the device 102 may be coupled to the device 104 via a network that includes a cellular link coupled to a data packet network, and the device 102 may be coupled to the device 106 via a data packet link such as a wide local area network (WLAN) coupled to a data packet network or a Public Switched Telephone Network (PSTN). Accordingly, many different network types and configurations may be used to couple the communication devices 102, 104, and 106 to one another.

Exemplary network, system, and connection types include the internet, WiMax, local area networks (LANs) (e.g., IEEE 802.11a and 802.11g wi-fi networks), digital audio broadcasting systems (e.g., HD Radio, T-DMB and ISDB-TSB), terrestrial digital television systems (e.g., DVB-T, DVB-H, T-DMB and ISDB-T), WiMax wireless metropolitan area networks (MANs) (e.g., IEEE 802.16 networks), Mobile Broadband Wireless Access (MBWA) networks (e.g., IEEE 802.20 networks), Ultra Mobile Broadband (UMB) systems, Flash-OFDM cellular systems, and Ultra wideband (UWB) systems. Furthermore, the present disclosure may be used with communications systems such as Global System for Mobile communications (GSM) and/or code division multiple access (CDMA) communications systems. Connections to such networks may be wireless or may use a line (e.g., digital subscriber lines (DSL), cable lines, and fiber optic lines).

Communication among the devices 102, 104, and 106 may be accomplished using predefined and publicly available (i.e., non-proprietary) communication standards or protocols (e.g., those defined by the Internet Engineering Task Force (IETF) or the International Telecommunications Union-Telecommunications Standard Sector (ITU-T)), and/or proprietary protocols. For example, signaling communications (e.g., session setup, management, and teardown) may use a protocol such as the Session Initiation Protocol (SIP), while data traffic may be communicated using a protocol such as the Real-time Transport Protocol (RTP). A conference call as described herein may be connection-based (e.g., using a protocol such as the transmission control protocol/internet protocol (TCP/IP)) or connection-less (e.g., using a protocol such as the user datagram protocol (UDP)). While the conference call is occurring, it is understood that other communications may occur, including, but not limited to, other audio and audio/video calls, instant messages, file transfer, emails, and any other type of resource transfer, where a resource represents any digital data.

Referring to FIG. 2, one embodiment of a computer system 200 is illustrated. The computer system 200 is one possible example of a system component or computing device such as one of the communication devices 102, 104, and/or 106 of FIG. 1. The computer system 200 may include a controller (e.g., a central processing unit ("CPU")) 202, a memory unit 204, an input/output ("I/O") device 206, and a network interface 208. The components 202, 204, 206, and 208 are interconnected by a transport system (e.g., a bus) 210. A power supply (PS) 212 may provide power to components of the computer system 200, such as the CPU 202 and memory unit 204. It is understood that the computer system 200 may be differently configured and that each of the listed components may actually represent several different components. For example, the CPU 202 may actually represent a multi-processor or a distributed processing system; the memory unit 204 may include different levels of cache memory, main memory, hard disks, and remote storage locations; the I/O device 206 may include monitors, keyboards, and the like; and the network interface 208 may include one or more network cards providing one or more wired and/or wireless connections to the network 108. Therefore, a wide range of flexibility is anticipated in the configuration of the computer system 200.

The computer system 200 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 200. The operating system, as well as other instructions (e.g., for an endpoint engine as described in a later embodiment if an endpoint), may be stored in the memory unit 204 and executed by the processor 202. For example, if the computer system 200 is one of the devices 102, 104, and 106, the memory unit 204 may include instructions for performing some or all of the message sequences and methods described herein.

Referring to FIG. 3A, an environment 300 illustrates one embodiment of the environment 100 of FIG. 1 where the device 102 is the bridge for the conference call. The device 102 has established a communication session with each of the devices 104 and 106. The device 102 (also referred to as "A") sends its own audio/video information to the device 104 ("B") in stream 302 and to the device 106 ("C") in stream 304. In the present example, the information is streamed, but it is understood that it may be transported in other ways. The device 104 ("B") sends its own audio/video information to the device 102 ("A") in stream 306, and the device 102 then sends B's information to the device 106 ("C") in stream 308. The device 106 ("C") sends its own audio/video information to the device 102 ("A") in stream 310, and the device 102 then sends C's information to the device 104 ("B") in stream 312.

Each device 102, 104, and 106 performs encoding for outbound traffic and decoding for inbound traffic. For example, as the bridge, the device 102 may be encoding outbound streams 302 and 304 (although these may be a single encode in some embodiments), as well as outbound streams 308 and 312. The device 102 may be decoding inbound streams 306 and 310. The device 104 may be encoding outbound stream 306 and decoding inbound streams 302 and 312. The device 106 may be encoding outbound stream 310 and decoding inbound streams 304 and 308. Accordingly, the bridge device 102 is generally performing more encoding than the other participants in the conference call because it is handling more than its own traffic.

Using the device 102 as an example, the device 102 may perform encoding/decoding for the conference call using various audio and video codecs that provide different levels of audio and video quality. For example, the device 102 may support video codecs such as MPEG-4, H.261, H.263, H.264, as well as other versions of those codecs such as H.263+ and H.263++. It is understood that many different codecs and codec versions may be used for audio and/or video encoding and decoding, and that different codecs have different overhead requirements. Codecs providing higher video framerates, video resolutions, audio bit rates, and similar parameters are generally more computationally intensive than codecs that are unable to support those parameters and that operate at lower video framerates, video resolutions, and/or audio bit rates. For example, H.261 is generally less computationally intensive than H.264. Additional memory may increase the amount of buffering available, resulting in fewer dropped packets and more space for encoding/decoding. Variations in codecs and codec versions may also change parameters by increasing or decreasing processing requirements relative to bandwidth requirements.

Accordingly, the encoding/decoding capabilities of the device 102 may be defined in part by its available processing power (e.g., CPU 202), available memory 204, and available bandwidth as accessed via the network interface 208. The different devices 102, 104, and/or 106 may have different encoding/decoding capabilities. Accordingly, the devices 102, 104, and/or 106 may be capable of handling different codecs, different numbers of connections, and similar conference call factors. For reasons such as these, one of the devices 102, 104, and/or 106 may be more capable of serving as a bridge than the other devices, even if the capability is not controlled by the device itself (e.g., available bandwidth).

Referring to FIG. 3B, an environment 320 illustrates one embodiment of the environment 300 of FIG. 3A where the device 102 has shifted the bridge to the device 104. Because of greater CPU, memory, and/or bandwidth capabilities, one of the devices 102, 104, and 106 may be more suited to operate as the bridge for the conference call than the other devices. In the present illustration, the device 104 has greater CPU, memory, and/or bandwidth capabilities than the device 102.

Accordingly, the device 104 is now the bridge and has established a communication session with each of the devices 102 and 106. The device 104 ("B") sends its own audio/video information to the device 102 ("A") in stream 322 and to the device 106 ("C") in stream 324. The device 102 ("A") sends its own audio/video information to the device 104 ("B") in stream 326, and the device 104 then sends A's information to the device 106 ("C") in stream 328. The device 106 ("C") sends its own audio/video information to the device 104 ("B") in stream 330, and the device 104 then sends C's information to the device 102 ("A") in stream 332.

It is understood that the sequence diagrams and flow charts described herein illustrate various exemplary functions and operations that may occur within various communication environments. It is understood that these diagrams are not exhaustive and that various steps may be excluded from the diagrams to clarify the aspect being described. For example, it is understood that some actions, such as network authentication processes and notifications, may have been performed prior to the first step of a sequence diagram by one or more of the communication devices 102, 104, and 106. Such actions may depend on the particular type and configuration of each communication device 102, 104, and 106, including how network access is obtained (e.g., cellular or WLAN access). Other actions may occur between illustrated steps or simultaneously with illustrated steps, including network messaging for call maintenance (including handoffs), communications with other devices (e.g., email, text messages, and/or voice calls (including conference calls)), and similar actions.

Referring to FIG. 4, a sequence diagram illustrates one embodiment of a message sequence 400 that may occur in the environment of FIG. 1 to establish a conference call, such as the conference call illustrated in FIG. 3A. In the present example, each of the devices 102, 104, and 106 is able to operate as a bridge for the call.

In step 402, the device 102 sends a request for a communication session to the device 104. The request may identify that the communication session is for a conference call and may identify the device 106 as another participant in the conference call. The request may also identify media parameters for the communication session, such as one or more audio and/or video codecs that the device 102 has available for the call. The codecs may be presented with codecs that are preferred by the device 102 denoted as such. For example, if the device 102 is able to support H.261, H.263, and H.264 for the conference call, it may present H.264 as its preferred codec, followed by H.263, with H.261 as an available but least preferred codec.

In step 404, the device 104 returns various parameters, including media parameters, device parameters, and network parameters. The media parameters may include one or more audio and/or video codecs available on the device 104, and/or may present codecs selected by the device 104 from the codecs available on the device 102. For example, of the H.261, H.263, and H.264 codecs available on the device 102, the device 104 may only be capable of supporting H.261. Accordingly, the device 104 would identify H.261 as a media parameter in step 404. The device parameters may include information about the device 104, such as the processing (e.g., CPU) capability and/or the available memory of the device. The network parameters may include the bandwidth available to the device 104, and may be specifically directed to the upstream bandwidth (i.e., the bandwidth available to the device 104 for outbound traffic).

In step 406, the device 102 sends a request for a communication session to the device 106. The request may identify that the communication session is a conference call and may identify the device 104 as another participant in the conference call. The request may also identify media parameters for the communication session, such as one or more audio and/or video codecs that the device 102 has available for the call. The audio/video codecs in the request 406 may be the same codecs sent to the device 104 or may be different. For example, if the device 102 has received the codecs available on the device 104 prior to sending the request in step 406, the device 102 may send only codecs that are available on both of the devices 102 and 104. In step 408, the device 106 returns various parameters, including media parameters, device parameters, and network parameters as described with respect to step 404.

In step 410, the device 102 selects which of the devices 102, 104, and 106 are to be used as a bridge. In the present example, all of the devices 102, 104, and 106 are able to serve as a bridge (e.g., each has the functionality needed to provide bridge services). Accordingly, the device 102 may compare the device parameters (e.g., the processing and available memory parameters) and/or the network parameters (e.g., the available bandwidth) of the devices 102, 104, and 106. In embodiments where one or both of the other devices 104 and 106 do not include bridge functionality, device(s) not able to bridge may not be compared. For example, if the device 106 does not include bridge functionality, the device 102 may compare only the device and/or network parameters of the devices 102 and 104. In such embodiments, the device 102 may not receive the device/network parameters of the device 106. In the present example, the device 102 selects itself as the best device to handle the bridge. For example, the device 102 may have better processing capabilities than the devices 104 and 106 (e.g., may be able to handle the encoding/decoding requirements of the bridge better due to additional CPU and/or memory capabilities) and/or may have more available bandwidth.

The device 102 may select session parameters for the communication sessions with the devices 104 and 106, such as codecs to be used. The device 102 may select the same parameters for both sessions or may select different parameters for each session. More specifically, the device 102 may normalize or optimize the sessions. For a normalized session, the device 102 identifies and selects the best codec to use with both the device 104 and the device 106. For example, if the device 102 supports H.264, the device 104 supports H.261 but not H.264, and the device 106 supports H.264, the device 102 may normalize to H.261 for both the session with the device 104 and the session with the device 106. For an optimized session, the device 102 would selects the best coded for each session individually. Accordingly, the device 102 may select H.261 for the session with the device 104 and H.264 for the session with the device 106. Optimized sessions for the conference call may be more overhead intensive for the bridge than normalized sessions as different encoding and decoding codecs may be used for different sessions, and codec conversions are needed to bridge the sessions.

In steps 412 and 414, the device 102 sends the session parameters to the devices 104 and 106, respectively. In steps 416 and 418, the device 102 establishes the communication sessions with the devices 104 and 106 based on the session parameters. For purposes of the conference call, these sessions may serve as call legs. In step 420, the device 102 bridges the two sessions and serves as the bridge for the conference call while also participating in the conference call.

Referring to FIG. 5, a sequence diagram illustrates one embodiment of a message sequence 500 that may occur in the environment of FIG. 1 to shift the bridge for the conference call from the device 102 to the device 104. The device 102 may be setting the conference call up when the shift is made (e.g., in step 410 of FIG. 4 before the sessions in steps 416 and 418 are established) or the conference call may be an existing conference call that is shifted after an event occurs, such as a change in parameters as discussed in detail below. For example, step 502 may be identical to step 410 of FIG. 4 and the steps of FIG. 5 may occur instead of the steps following step 410 of FIG. 4. Alternatively, step 502 may occur after the conference call of FIG. 4 is set up, such as during step 420. In the present example, each of the devices 102, 104, and 106 is able to operate as a bridge for the call.

In step 502, the device 102 may select which of the devices 102, 104, and 106 are to be used as a bridge. In the present example, all of the devices 102, 104, and 106 are able to serve as a bridge (e.g., each has the functionality needed to provide bridge services). Accordingly, the device 102 may compare the device parameters (e.g., the CPU and available memory parameters) and/or the network parameters (e.g., the available bandwidth) of the devices 102, 104, and 106. In embodiments where one or both of the other devices 104 and 106 do not include bridge functionality, device(s) not able to bridge would not be compared. For example, if the device 106 does not include bridge functionality, the device 102 may compare only the device and/or network parameters of the devices 102 and 104. In such embodiments, the device 102 may not receive the device and network parameters of the device 106. In the present example, the device 102 selects the device 104 as the device that is to handle the bridge.

In step 504, the device 102 sends a notification to the device 104 that the device 104 is to be the bridge. The notification may be an instruction to the device 104 or a request that the device 104 take over as the bridge. The notification may also terminate the current session with the device 104 or place it on hold. In step 506, the device 102 may also send a message to the device 106 to terminate or hold the current session with the device 106. This message may be sent later in some embodiments, such as after step 508. In still other embodiments, the device 104 may inform one or both of the devices 102 and 106 that they are to terminate or hold their current sessions.

At this point, the device 104 may function in a similar or identical manner to that described with respect to the device 102 in FIG. 4 for call setup. Accordingly, in step 508, the device 104 sends a request for a communication session to the device 104 and, in step 510, the device 102 returns various parameters, including media parameters, device parameters, and network parameters. In some embodiments, the device 102 may send the parameters for the device 102 with or in addition to the notification of step 504, in which case steps 508 and 510 may not be performed. In step 512, the device 104 sends a request for a communication session to the device 106 and, in step 514, the device 106 returns various parameters, including media parameters, device parameters, and network parameters. In some embodiments, the device 102 may send the parameters for the device 104 with or in addition to the notification of step 504, in which case steps 512 and 514 may not be performed.

In step 516, the device 104 may select which of the devices 102, 104, and 106 are to be used as a bridge. For example, the device 104 may execute the same logic as described previously with respect to the device 102. In other embodiments, step 516 may be omitted and the device 104 may rely on the decision made by the device 102 in step 502. The device 104 may select session parameters for the communication sessions with the devices 102 and 106 as described previously with respect to the device 102. In other embodiments, the device 104 may use parameters received from the device 102. In steps 518 and 520, the device 104 sends the session parameters to the devices 102 and 106, respectively.

In steps 522 and 524, the device 104 establishes the communication sessions with the devices 102 and 106 based on the session parameters. For purposes of the conference call, these sessions may serve as call legs. In step 526, the device 104 bridges the two sessions and serves as the bridge for the conference call. Accordingly, the bridge is transferred from the device 102 to the device 104 and the conference call continues.

It is noted that a similar or identical sequence may be used when the device serving as the bridge is to leave a conference call. For example, if the device 102 is the bridge and is exiting the conference call, it may initiate a bridge transfer to one of the devices 104 or 106 to enable the call to continue between the devices 104 and 106. In other embodiments, the device 102 may notify the other device or devices that it is leaving and one of the other devices may then initiate a regular call if there are only two devices remaining.

Referring to FIG. 6, a sequence diagram illustrates one embodiment of a message sequence 600 that may occur in the environment of FIG. 1 when a change occurs in the device and/or network parameters of the device 104, which is not the current bridge for the conference call. For example, the device 104 may move from one network to another network, and that network change may increase or decrease the amount of bandwidth available to the device 104. The device 104 may also be swept to another device while the communication session with the device 102 is maintained. Such sweeping is described in U.S. patent application Ser. No. 12/749,251, filed on Mar. 29, 2010, and entitled SYSTEM AND METHOD FOR SESSION SWEEPING BETWEEN DEVICES. The sweeping from one device to another device may change the device parameters, such as processing capability and/or available memory. Either of the device and network changes may affect the capability of the device 104 to serve as a bridge.

Accordingly, in step 602, the device 104 detects a change in its device and/or network parameters. In step 604, the device 104 sends the changed parameters to the device 102. In some embodiments, the device 104 may compare the changed parameters to the previous parameters and only send the changed parameters if they affect the communication session relative to the previous parameters. For example, if the only change occurred with the available memory of the device 104, the device 104 may notify the device 102 if the available memory of the device 104 has increased, while the device 104 may not notify the device 102 if the available memory has decreased unless it affects the current codec(s) used in the session. The change may also affect the media supported by the device 104. For example, if the device 104 is swept to a device that has greater processing and/or memory capabilities and/or available bandwidth, the device 104 may be able to handle H.264 media rather than the H.261 media handled by the previous device.

In step 606, the device 102 may perform the bridge selection process as previously described to determine whether the bridge should be moved. In some embodiments, the device 102 may recalculate the bridge based on the parameters of all three devices 102, 104, and 106. In other embodiments, the device 102 may only compare the devices 102 and 104 because, for example, the device 102 is the current bridge and the device 106 has not changed. As the device 106 has not changed, the device 102 should still select itself as the bridge over the device 106. In the present example, the device 102 is still a better bridge than the device 104 and selects itself as the bridge (e.g., the device 102 remains the bridge).

In step 608, if the media parameters have changed (e.g., if the sessions are normalized and the media has changed from H.261 to H.264), the device 102 may change its own media parameters. For example, the device 102 may switch from H.261 encoders/decoders to H.264 encoders/decoders. It is understood that in normalized sessions, the device 102 may change the media parameters associated with both sessions. In optimized sessions, the device 102 may only change the encoders/decoders corresponding to the session with the device 104. In still other embodiments, the device 102 may switch from normalized sessions to optimized sessions or from optimized sessions to normalized sessions based on the changed parameters.

In step 610, the device 102 may send the changed parameters to the device 104 and, in step 612, the device 104 may update its session parameters. In step 614, the device 102 may send the changed parameters to the device 106 and, in step 616, the device 106 may update its session parameters. In step 618, the device 102 continues to bridge the sessions for the conference call.

It is noted that a similar or identical sequence may occur if another device is added to the conference call. For example, if a fourth device joins the call, the device 102 may establish a communication session with the fourth device and treat the addition of the fourth device as a change in the conference call, thereby triggering the bridge and/or media selection process. Accordingly, the addition of a fourth device to the conference call may result in a bridge transfer and/or new media parameters for one or more of the devices involved in the call.

Referring to FIG. 7, a sequence diagram illustrates one embodiment of a message sequence 700 that may occur in the environment of FIG. 1 when a change occurs in the device and/or network parameters of the device 104, which is not the current bridge for the conference call. For example, the device 104 may move from one network to another network, and that network change may increase or decrease the amount of bandwidth available to the device 104. The device 104 may also be swept to another device while the communication session with the device 102 is maintained. Such sweeping is described in U.S. patent application Ser. No. 12/749,251, filed on Mar. 29, 2010, and entitled SYSTEM AND METHOD FOR SESSION SWEEPING BETWEEN DEVICES. The sweeping from one device to another device may change the device parameters, such as processing capability and/or available memory. Either of the device and network changes may affect the capability of the device 104 to serve as a bridge.

Accordingly, in step 702, the device 104 detects a change in its device and/or network parameters. In step 704, the device 104 sends the changed parameters to the device 102. In some embodiments, the device 104 may compare the changed parameters to the previous parameters and only send the changed parameters as described with respect to FIG. 6.

In step 706, the device 102 may perform the bridge selection process as previously described to determine whether the bridge should be moved. In some embodiments, the device 102 may recalculate the bridge based on the parameters of all three devices 102, 104, and 106. In other embodiments, the device 102 may only compare the devices 102 and 104 because, for example, the device 102 is the current bridge and the device 106 has not changed. As the device 106 has not changed, the device 102 should still select itself as the bridge over the device 106. In the present example, the device 102 determines that the device 104 should serve as the bridge rather than the device 102 and selects the device 104 as the bridge.

In step 708, the device 102 sends a notification to the device 104 that the device 104 is to be the bridge. In step 710, the device 104 performs a bridge setup process as previously described. This may include the establishment of new sessions between the devices 102 and 104 and the devices 104 and 106, as well as the tearing down of previous sessions. In step 612, the conference call is continued with the device 104 serving as the bridge rather than the device 102.

Referring to FIG. 8, a sequence diagram illustrates one embodiment of a message sequence 800 that may occur in the environment of FIG. 1 when a change occurs in the device and/or network parameters of the device 102, which is the current bridge for the conference call. For example, the device 102 may move from one network to another network, and that network change may increase or decrease the amount of bandwidth available to the device 102. The device 102 may also be swept to another device while the communication sessions with the devices 104 and 106 are maintained. Such sweeping is described in U.S. patent application Ser. No. 12/749,251, filed on Mar. 29, 2010, and entitled SYSTEM AND METHOD FOR SESSION SWEEPING BETWEEN DEVICES. The sweeping from one device to another device may change the device parameters, such as processing capability and/or available memory. Either of the device and network changes may affect the capability of the device 102 to serve as a bridge.

Accordingly, in step 802, the device 102 detects a change in its device and/or network parameters. In steps 804 and 806, the device 102 may send forwarding messages to the devices 104 and 106, respectively. For example, if the device 102 is being swept to another device, the forwarding messages may instruct the devices 104 and 106 to hold the call until the sweep is finished and/or switch to another network address/port for the device 102. In some embodiments, the device 102 may determine whether the change affects the conference call (e.g., whether the change is a handoff of the device 102 from one network to another network with no network address/port change) and may send the forwarding notifications of steps 804 and 806 only if the notifications are needed. In step 808, the device 102 may perform bridge and/or session parameter selection as previously described.

Figure 9:
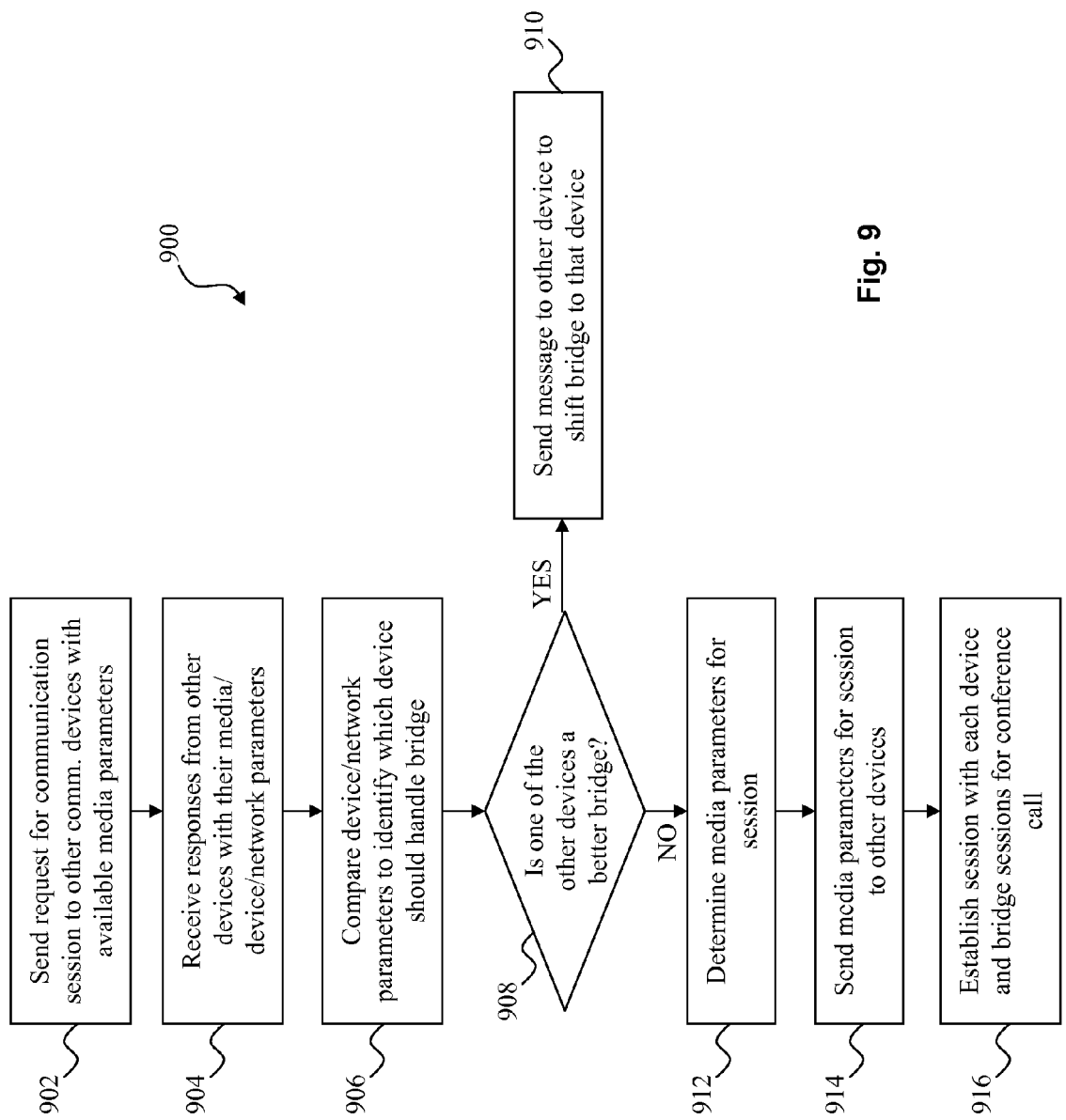
FIG. 9 is a flow chart illustrating one embodiment of a method that may be executed by one of the devices of FIG. 1 to initiate a conference call and select one of the devices as the bridge.

Referring to FIG. 9, a flowchart illustrates one embodiment of a method 900 that represents a process by which a communication device such as the device 102 of FIG. 1 may initiate a conference call with other devices such as the devices 104 and 106. In the present example, the devices 102, 104, and 106 may all serve as a bridge.

In step 902, a request for a communication session is sent by the device 102 to the devices 104 and 106. The request may contain information identifying that the session is for a conference call, the conference call participants, and/or available media options. In step 904, the device 102 receives responses from the devices 104 and 106 with media, device, and/or network parameters for each device. In step 906, the device and network parameters are compared to identify which of the devices 102, 104, and 106 should operate as the bridge for the conference call. In step 908, a determination is made as to whether one of the other devices 104 and 106 is to be the bridge. If one of the devices 104 or 106 is to be the bridge instead of the device 102, the method 900 moves to step 910, where a message is sent to the device selected as the bridge to shift the bridge to that endpoint. If the device 102 is to be the bridge, the method 900 moves to step 912.

In step 912, the media parameters are selected for the sessions. As described previously, the sessions may be normalized or optimized, so the sessions may have the same or different media parameters. In step 914, the media parameters for each session are sent to the other devices 104 and 106. In step 916, the sessions are established with each of the other devices 104 and 106 and the device 102 bridges the sessions for the conference call. The device 102 may then participate in the conference call with the devices 104 and 106 while serving as the call bridge.

Figure 10:
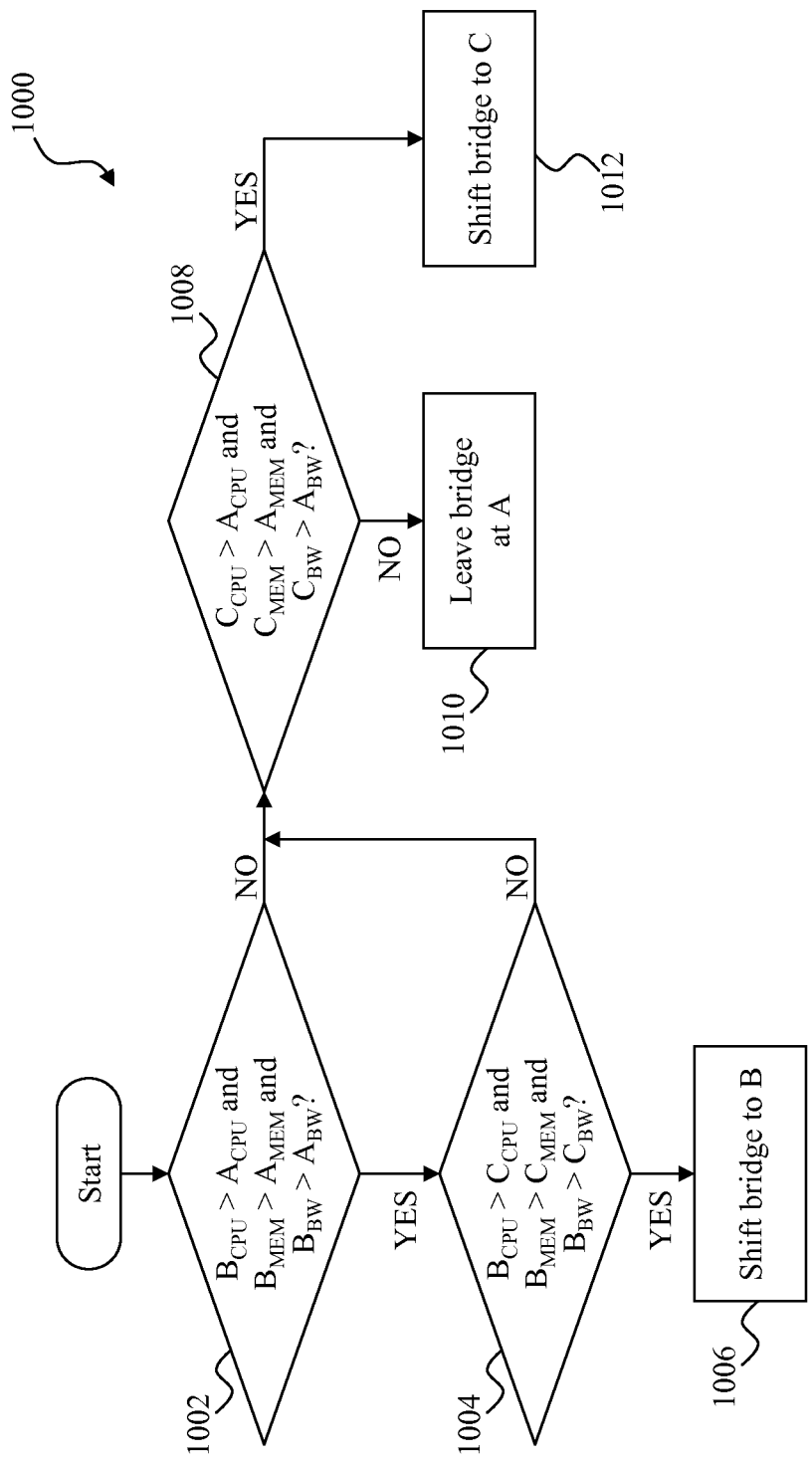
FIG. 10 is a flow chart illustrating one embodiment of a method that may be executed by one of the devices of FIG. 1 to select one of the devices as the bridge.

Referring to FIG. 10, a flowchart illustrates one embodiment of a method 1000 that represents a process by which a device such as the device 102 of FIG. 1 may select a bridge for a conference call. For example, the method 1000 may be used in step 906 to determine which of the devices 102, 104, and 106 should serve as the bridge. In the present example, the devices 102, 104, and 106 may all serve as a bridge. It is understood that other comparisons may be made to select the bridge if additional devices are present.

For purposes of illustration, the method 1000 refers to device 102 as "A," device 104 as "B," and device 106 as "C." The device 104 ("A") has a corresponding processing capability denoted $A_{CPU}$, an available memory $A_{MEM}$, and an available bandwidth $A_{BW}$. The devices 104 ("B") and 106 ("C") have corresponding parameters. It is understood that the parameters may be measured in different ways and may take into account many different factors. For example, $A_{CPU}$ may take into account the actual CPU of the device 102, including whether the CPU is single core or multi-core, the amount of cache memory of the CPU, the threading capabilities of the CPU, and similar factors. Accordingly, $A_{CPU}$ may be a single parameter representing one or more factors or may be multiple parameters. $A_{MEM}$ may take into account the various types of available memory, and $A_{MEM}$ may be a single parameter representing one or more factors or may be multiple parameters. $A_{BW}$ may take into account the overall available bandwidth of the device, including the upstream and downstream bandwidths, or may represent a particular factor of the bandwidth (e.g., upstream bandwidth). Accordingly, $A_{BW}$ may be a single value representing one or more factors or may be multiple parameters. Any of the parameters represented by $A_{CPU}$, $A_{MEM}$, and $A_{BW}$ may be weighted, as may individual factors forming the parameters.

In step 1002, the method 1000 determines whether the processing capability of B is greater than the processing capability of A (i.e., $B_{CPU}>A_{CPU}$), whether B has more available memory than A (i.e., $B_{MEM}>A_{MEM}$), and whether B has more available bandwidth than A (i.e., $B_{BW}>A_{BW}$). In the present example, all three comparisons must be in B's favor in order for B to be considered as a bridge. In other embodiments, one or more of the parameters may be sufficient (e.g., two out of three in B's favor may be enough), and the parameters may be weighted to alter the results. For example, bandwidth may be weighted compared to processing and memory, in which case B may be selected if it has the most available memory and bandwidth, even if A has more processing capability.

If the determination of step 1002 identifies that B is more suitable as a bridge than A, the method 1000 moves to step 1004, where a determination is made as to whether the processing capability of B is greater than the processing capability of C (i.e., $B_{CPU}>C_{CPU}$), whether B has more available memory than C (i.e., $B_{MEM}>C_{MEM}$), and whether B has more available bandwidth than C (i.e., $B_{BW}>C_{BW}$). As with step 1002, in the present example, all three comparisons must be in B's favor in order for B to be considered as a bridge, although other embodiments may not have the same requirement. If the determination of step 1004 results in the selection of B as the bridge over C, the method 1000 moves to step 1006, where the bridge is shifted to B as described in other embodiments.

If the determination of step 1002 does not result in the selection of B as the bridge over A or if the determination of step 1004 does not result in the selection of B as the bridge over C, the method 1000 moves to step 1008. In step 1008, a determination is made as to whether the processing capability of C is greater than the processing capability of A (i.e., $C_{CPU} > A_{CPU}$), whether C has more available memory than A (i.e., $C_{MEM} > A_{MEM}$), and whether C has more available bandwidth than A (i.e., $C_{BW} > A_{BW}$). As with step 1002, in the present example, all three comparisons must be in C's favor in order for C to be considered as a bridge, although other embodiments may not have the same requirement. If the determination of step 1008 results in the selection of A as the bridge over C, the method 1000 moves to step 1010, where the bridge remains with A as described in other embodiments. If the determination of step 1008 results in the selection of C as the bridge over A, the method 1000 moves to step 1012, where the bridge is shifted to C as described in other embodiments.

Referring to FIG. 11A, a flowchart illustrates one embodiment of a method 1100 that represents a process by which a device such as the device 102 of FIG. 1 may determine whether to continue with a bridge selection process. For example, if an event occurs that triggers or would trigger the bridge selection process, the method 1100 may be executed to determine whether to continue with the process or whether the process should be skipped (if not yet started) or aborted (if already started).

In step 1102, the bridge selection process is triggered and, in step 1104, the event that triggered the bridge selection process is identified. The event may be the initiation of a conference call, a change in the device/network parameters of one of the devices participating in the conference call, the addition of another device to the conference call, or any other event that results in execution of the bridge selection process.

In step 1106, a determination is made as to whether the bridge selection process should continue. The bridge selection process may be allowed to continue or skipped/aborted based on various factors. For example, if the bridge selection process was triggered when the device 102 received parameters from the devices 104 and 106 after initiating a conference call, it may be allowed to continue in order to select the bridge to be used for the conference call. A change in device/network parameters and/or the addition of a new device to the conference call may also enable the bridge selection process to continue unless such changes begin occurring relatively quickly. More specifically, it may not be desirable to repeatedly change bridge devices within a certain time frame. For example, if one of the devices is repeatedly changing networks and the networks vary in quality enough to result in frequent bridge shifts, it may be desirable to limit the bridge shifting to avoid the additional overhead imposed by bridge transfer, such as session setup and teardown.

It is understood that such limitations may or may not include a strict time limitation, but may be based on one or more other factors, such as an amount of overhead imposed by bridge shifting versus the benefit gained by bridge shifting. Furthermore, if time limitations are involved, they may be varied for various reasons. Accordingly, step 1106 may vary based on such factors as available bandwidth and processing/memory capabilities of the devices themselves. For example, if the device/network parameters of the device 102 are close to those of the device 104, frequent bridge switching may be prevented due to relatively minor performance gains and/or slow bridge transfers or may be allowed due to relatively fast transfers. Such decisions may be made dynamically by the device 102 to handle different conferencing scenarios.

If the determination of step 1106 determines that the bridge selection process should not continue, the method 1100 moves to step 1108, where the bridge selection process is skipped/aborted and the conference call continues. If the determination of step 1106 determines that the bridge selection process should continue, the method 1100 moves to step 1110, where the bridge selection process is performed as previously described.

Referring to FIG. 11B, a flowchart illustrates one embodiment of a method 1120 that represents a process by which a device such as the device 102 of FIG. 1 may determine whether another device (e.g., the device 104 or 106) includes bridge functionality. For example, the device 106 may not be configured to provide bridge functions if it is an audio/video component of a teleconference system. In another example, the device 106 may be a regular landline telephone coupled to the rest of the network 108 via a PSTN, and may not be capable of operating as a bridge and, in some embodiments, may not be capable of receiving or sending video. In still another example, the device 106 may be capable of serving as a bridge, but may not be configured to do so (e.g., may lack the software needed to perform bridge functions). Accordingly, the device 102 may determine whether the other devices contain such functionality.

The process used to determine whether another device may contain bridge functionality may vary depending on the device 102. For example, the device 102 may be an endpoint in a peer-to-peer network, such as is described below and in U.S. Pat. No. 7,656,870, filed on Mar. 15, 2005, and entitled SYSTEM AND METHOD FOR PEER-TO-PEER HYBRID COMMUNICATIONS. If an endpoint, the device 102 may determine whether the devices 104 and 106 are buddy endpoints. If so, the device 102 may use that knowledge to determine whether they are capable of operating as bridges. For example, any endpoint capable of logging into an access server of the peer-to-peer network may have the functionality needed to serve as an endpoint. If the other endpoint is not a buddy of the device 102, the device 102 may request the establishment of a temporary buddy relationship in order to establish the session with that endpoint. If the other device is not an endpoint, the device 102 may not include it in bridge calculations or may include it only if it returns the needed parameters.

If the device 102 is not an endpoint in a peer-to-peer network, it may determine whether to include another device in the bridge calculations based on what it knows of the other device. For example, if the device 102 sends media parameters to the other device and does not receive device and/or network parameters in return, the device 102 may conclude that the other device is not configured to handle bridging. In such embodiments, the device 102 may perform the bridge calculations based only on devices from which it received device/network parameters.

Accordingly, in step 1122, the device 102 may send a request for a communication session to the other devices 104 and 106 that are to be included in the conference call. As described previously, the request may contain media parameters. The media parameters may be used to set up a session regardless of whether the other device is capable of being a bridge. For example, if the other device is a mobile device or desktop computer that is not configured with bridging functionality, it may use the media parameters to set up the session even though it cannot serve as a bridge. In other embodiments, the device 102 may have already identified certain of the devices 104 and 106 as not needing some or all of the media parameters, and so may not send the parameters to those devices. For example, the device 102 may have already identified that the device 106 is a PSTN coupled landline telephone without video capability, and so the device 102 may not send video parameters to the device 106.

In step 1124, a determination may be made as to whether the device 102 has received media/device/network parameters from either of the devices 104 and 106. If no parameters have been received, the method 1110 moves to step 1126, where the device 102 may skip the bridge selection process and continue with session establishment and bridging for the conference call on the assumption that the devices 104 and 106 cannot serve as a bridge. If media/device/network parameters have been received, the device 102 may continue to step 1128, where it continues with the bridge selection process as previously described. It is understood that receiving only media parameters may not be sufficient for moving the method from step 1124 to step 1128, since the responding device may be capable of handling a particular level of media as a participant but not as the bridge, or the device may not be configured as a bridge.

Figure 12:
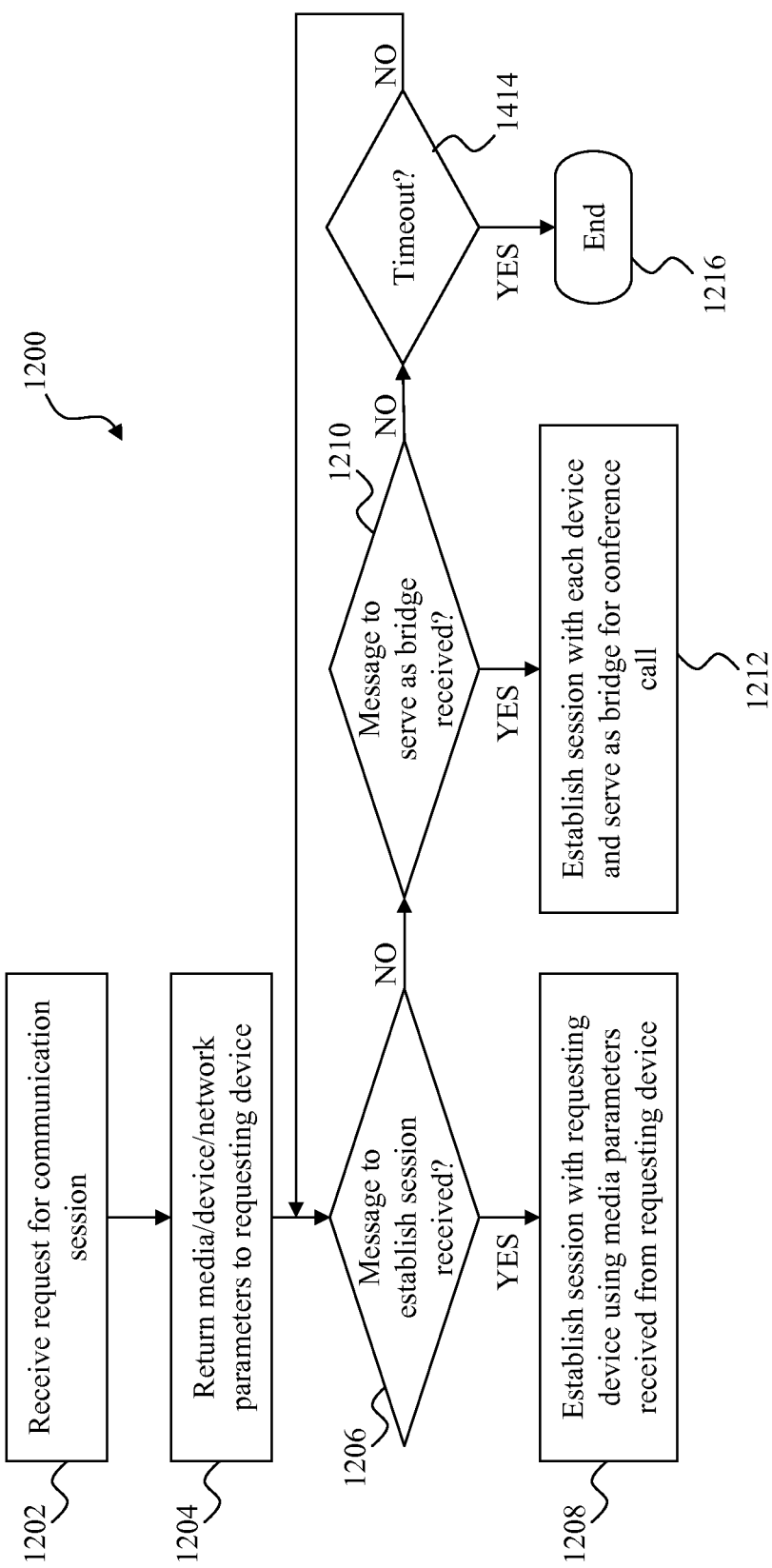
FIG. 12 is a flow chart illustrating one embodiment of a method that may be executed by one of the devices of FIG. 1 in response to a request from another of the devices for a conference call.

Referring to FIG. 12, a flowchart illustrates one embodiment of a method 1200 that represents a process by which a device such as the device 104 of FIG. 1 may establish a communication session initiated by another device (e.g., the device 102). In the present example, the device 104 includes bridge functionality.

In step 1202, a request for a communication session is received by the device 104 from the device 102. The request may contain media parameters for the session, such as what media options are supported by the device 102. In step 1204, assuming the device 104 accepts the request, the device 104 sends its media, device, and network parameters to the device 102. In step 1206, a determination may be made as to whether a message to establish the session is received from the device 102. The message may contain media parameters to use for the session. If the determination of step 1206 indicates that a message was received, the method 1200 moves to step 1208, where the session is established using the media parameters.

If the message to establish the session was not received, the method 1200 moves to step 1210, where a determination may be made as to whether a message to shift the bridge to the device 104 has been received. If such a bridge transfer message has been received, the method 1200 moves to step 1212, where the device 104 performs session establishment and bridging as previously described. In some embodiments, step 1212 may include performing a bridge selection process. If no bridge transfer message has been received, the method 1200 may move to step 1214, where a determination is made as to whether a timeout has occurred. If no timeout has occurred, the method 1200 returns to step 1206. If a timeout has occurred, the method 1200 may end in step 1216.

Figure 13:
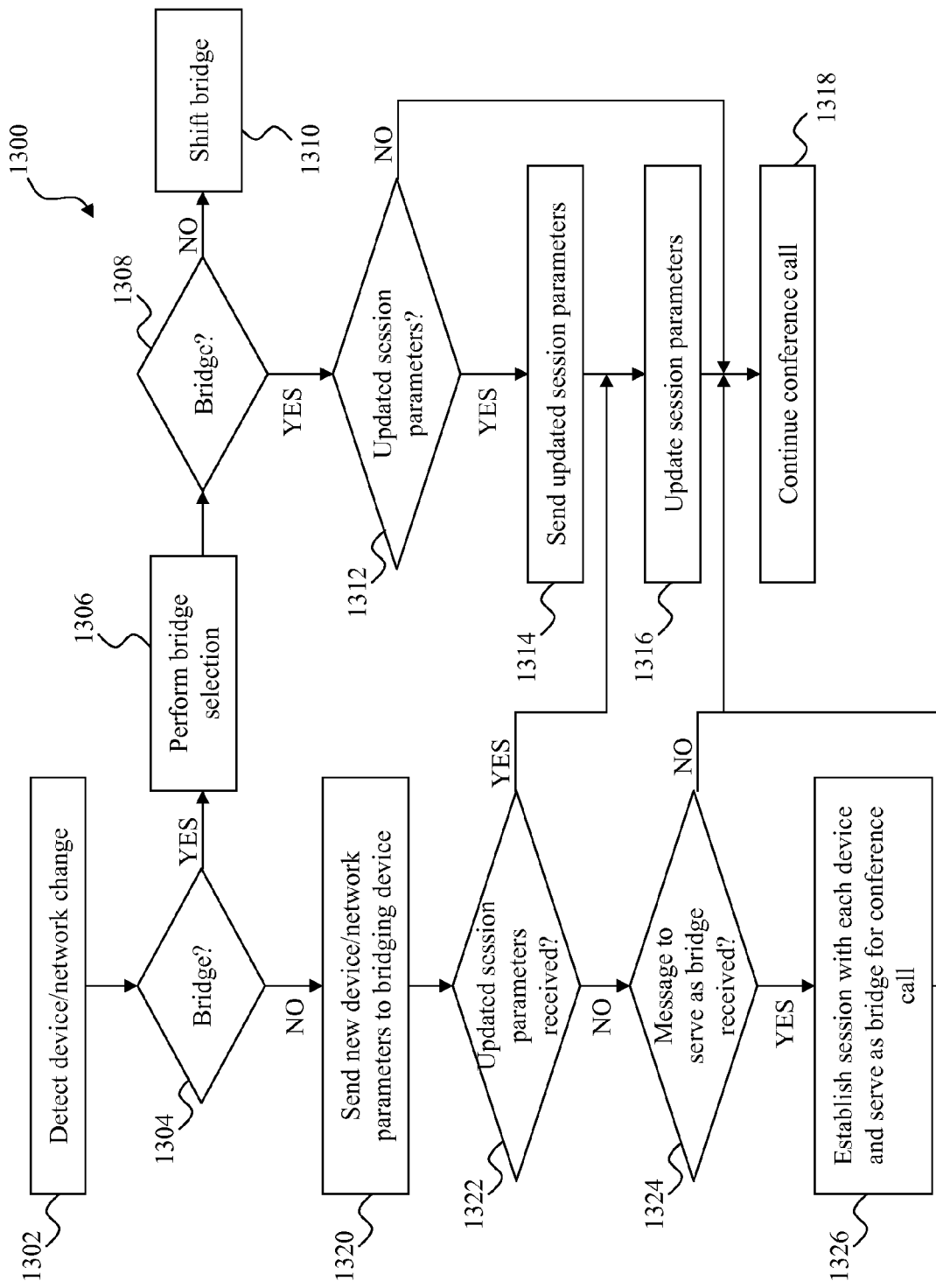
FIG. 13 is a flow chart illustrating one embodiment of a method that may be executed by one of the devices of FIG. 1 when a change is detected in the device's device and/or network parameters.

Referring to FIG. 13, a flowchart illustrates one embodiment of a method 1300 that represents a process by which a device such as the device 102 of FIG. 1 may handle a change in its device and/or network parameters. When the method 1300 begins, the device 102 is engaged in a conference call with the endpoints 104 and 106.

In step 1302, a change is detected in one or more of the device and/or network parameters of the device 102. For example, the device 102 may move from one network to another or may be swept to another device. In step 1304, a determination may be made as to whether the device 102 is the current bridge for the conference call. If the device 102 is the current bridge, the method 1300 moves to step 1306, where a bridge selection process is performed as previously described using the changed parameters. After the bridge selection process, a determination is made in step 1308 as to whether the device 102 is still selected as the bridge. If not (i.e., if another device is to be the bridge), the method 1300 moves to step 1310, where the bridge is transferred to the other device. If the device 102 is to remain the bridge, the method 1300 moves to step 1312, where a determination may be made as to whether the session parameters should be updated. If the session parameters are not to be updated, the method 1300 moves to step 1318, where the conference call continues without changes.

If the session parameters are to be updated as determined in step 1312, the method 1300 moves to step 1314, where updated session parameters are sent to the other devices in the conference call. In step 1316, the device 102 updates its own parameters for the sessions. The method 1300 then moves to step 1318, where the conference call continues with the changed parameters.

If the device is not the current bridge as determined in step 1304, the method 1300 moves from step 1304 to step 1320, where the changed parameters are sent to the current bridge. For example, if the device 104 is the current bridge, the device 102 may send its changed parameters to the device 104. In step 1322, a determination is made as to whether changed session parameters have been received from the bridge. For example, if the device 102 sends its changed parameters to the bridge, the bridge may determine that it should remain the bridge, but may send out updated session parameters.

If the determination of step 1322 identifies that new parameters have been received, the method 1300 moves to step 1316, where it updates its parameters. The method 1300 then moves to step 1318, where the conference call continues with the changed parameters. If the determination of step 1322 identifies that no new parameters have been received, the method 1300 moves to step 1324, where a determination is made as to whether a message has been received indicating that the device 102 is to be the bridge for the conference call. If no message has been received indicating that the device 102 is to be the bridge, the method 1300 moves to step 1318, where the conference call continues. If a message has been received indicating that the device 102 is to be the bridge, the method 1300 moves to step 1326, where the device 102 establishes sessions with the other devices, bridges the sessions, and continues the conference call as the bridge. The method 1300 then moves to step 1318, where the conference call continues with the new bridge.

Figure 14:
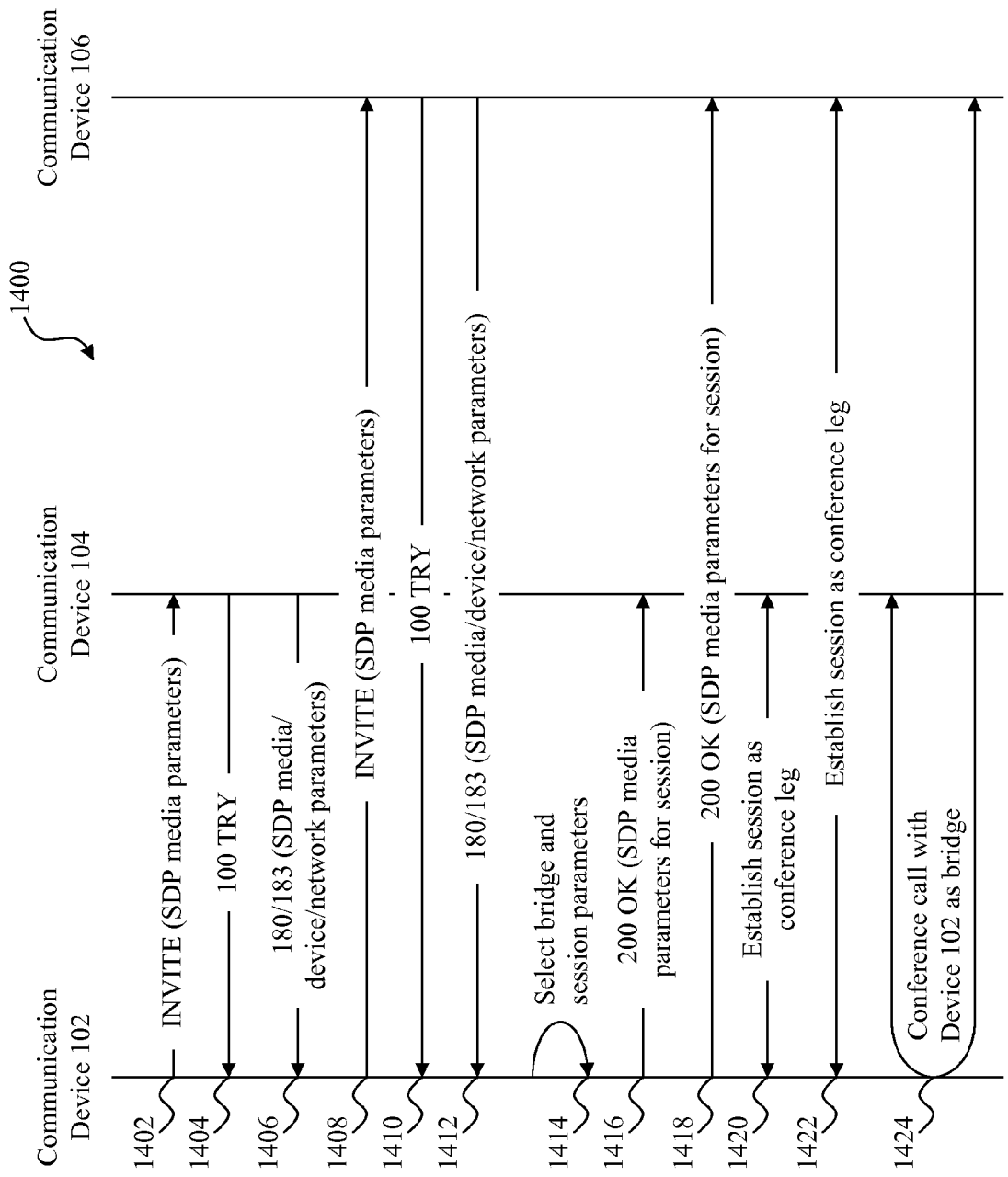
FIG. 14 is a sequence diagram illustrating one embodiment of a process that may be executed by the devices of FIG. 1 to initiate a conference call and select one of the devices as the bridge.

Referring to FIG. 14, a sequence diagram illustrates one embodiment of a message sequence 1400 that may occur in the environment of FIG. 1 to establish a conference call, such as the conference call illustrated in FIG. 3A, where each of the devices 102, 104, and 106 is able to operate as a bridge for the call. For example, the sequence 1400 may be a more specific embodiment of portions of the sequence 400 of FIG. 4. Signaling is accomplished via SIP and parameters are exchanged using Session Description Protocol (SDP) extensions. It is understood that the SIP signaling, specific SIP messages, and the SDP extensions described in the present embodiment are for purposes of example only, and that other SIP messages, SDP fields, signaling protocols, and parameters formats may be used.

Prior to step 1402, the device 102 initiates the conference call. The device 102 may assign an identifier, such as a thirty-two bit SSRC to each participant of the conference call, or the participants may advertise their own SSRC (e.g., in steps 1406 and 1412). The identifiers may be used to identify which stream belongs to which device 102, 104, and 106. It is noted that there may also be a call identifier that is assigned to each SIP session (i.e., there may be one call IDs for the session between the devices 102 and 104 and another call ID for the session between the devices 102 and 106).

In step 1402, the device 102 sends a request for a communication session to the device 104. The request may be a message such as a SIP INVITE that contains SDP media parameters. For example, SDP generally provides for session, time, and media descriptions as defined in IETF RFCs 2327 and 4566, which are incorporated herein by reference in their entirety. Each of the session, time, and media description includes optional fields. Accordingly, the request of step 1402 may include optional fields in the media description, such as an "M" line media identifier followed by one or more "a" fields that provides zero or more media attribute lines. Using SDP fields such as the "a" fields, the device 102 sends the codecs it has available for the communication session to the device 104. For example, the Common International Format (CIF) is used in video teleconferencing systems and may be used. A related format is Quarter CIF (QCIF). The device 102 may include "a" fields in the SDP media description for "a=QCIF:1" and "a=CIF:2" to identify what the device 102 can support at the highest possible resolution. A description of how to send CIF and QCIF over communication channels is detailed in RFC 4629, which is incorporated herein by reference in its entirety.

The message may also contain SDP fields representing device and network parameters. For example, one of the SDP session description fields may be extended in the form of a=<attribute>:<value> to represent the device and network parameters as "a=cpu:[speed]" (where speed is a known processing speed such as 500 mhz), "a=memory:[memory size]" (where memory size is the size of the available operating memory for the conference call], and "a=network:[type]" or "a=network:[rate]" (where type is a network type such as 3G, 4G, or wifi, and speed is an available network rate such as 56 Mbit/s upstream). It is understood that many different parameters and values may be provided in the SDP message or messages, may be placed in different fields, and may use different values and/or identifiers.

One possible example of an INVITE message's contents is provided below for devices that are in a peer-to-peer environment, although a similar or identical message format may be used for non-peer-to-peer devices. In this example, the CPU is a=cpu:2253/2; where 2253 is the processor speed in megahertz and 2 is the number of processors. The device memory is a=mem:256m, where 256m is 256 Megabytes. The "m" may be replaced by a "k" to indicate Kilobytes or a "g" to indicate Gigabytes. The bandwidth is a=bw:1024dl/712ul, where 1024dl stands for 1024 kbps downlink and 712ul stands for 712 uplink.

INVITE sip:p2p@damaka.com SIP/2.0
    Via: SIP/2.0/UDP 192.168.1.10:5040;rport
    Max-Forwards: 70
    From: "P2P Mobile User"<sip:p2pmobile@damaka.com>;tag=12345678
    To: "P2P User"<sip:p2p@damaka.com>
    Call-ID: 123456789@10.1.168.192
    CSeq: 2 INVITE
    Contact: <sip:192.168.1.10:5040>
    User-Agent: damaka UA
    Content-Type: application/sdp
    Content-Length: . . .
    v=0
    o=–0 0 IN IP4 192.168.1.10
    s=session
    c=IN IP4 192.168.1.10
    b=CT:1000
    t=0 0
    m=audio 54742 RTP/AVP 0 101
    a=rtpmap:0 PCMU/8000
    a=rtpmap:101 telephone-event/8000
    a=fmtp:101 0-16
    m=video 51071 RTP/AVP 34
    a=rtpmap:34 H263/90000
    a=cpu:2253/2
    a=mem:256m
    a=bw:1024dl/712ul In step 1404, the communication device 104 responds to the INVITE with a message such as a 100 TRY and, in step 1406, sends its media/device/network parameters to the communication device 102 via SIP messaging. It is noted that a message such as a SIP 200 OK or a similar message indicating call acceptance may not be used in step 1406 as that may connect the call and, in the present embodiment, the bridge device and media parameters have not yet been selected for the call. The signaling used in step 1406 may be a message such as a 180 Ringing message, a 183 Session Progress message, or a similar message that indicates that the call has not been rejected or accepted.

The message may contain SDP fields representing parameters that define the media supported by the device 104 from the options presented by the device 102 in step 1402. The message may also contain SDP fields representing device and network parameters. For example, one of the SDP session description fields may be extended in the form of a=<attribute>:<value> to represent the device and network parameters as "a=cpu:[speed]" (where speed is a known processing speed such as 500 mhz), "a=memory:[memory size]" (where memory size is the size of the available operating memory for the conference call], and "a=network:[type]" or "a=network:[rate]" (where type is a network type such as 3G, 4G, or wifi, and speed is an available network rate such as 56 Mbit/s upstream). It is understood that many different parameters and values may be provided in the SDP message or messages, may be placed in different fields, and may use different values and/or identifiers.

In steps 1408, 1410, and 1412, the process of steps 1402, 1404, and 1406 is repeated between the device 102 and the device 106. It is noted that when the messages of steps 1406 and 1412 are sent, the users of the devices 104 and 106 may not be aware of the setup. For example, there may be a display message indicating that a video call is being established or there may be no indication. In step 1414, the device 102 selects the bridge and media parameters for the sessions. In steps 1416 and 1418, the device 102 sends the selected media parameters to the devices 104 and 106, respectively. In steps 1420 and 1422, the device 102 establishes the sessions with the devices 104 and 106, respectively, and bridges and participates in the conference call in step 1424.

Referring to FIG. 15, a sequence diagram illustrates one embodiment of a message sequence 1500 that may occur in the environment of FIG. 1 to shift a conference call bridge without consultation. For example, the sequence 1500 may be used to shift the bridge from the position illustrated in FIG. 3A to the position illustrated in FIG. 3B. Each of the devices 102, 104, and 106 is able to operate as a bridge for the call. For example, the sequence 1500 may be a more specific embodiment of a portion of the sequence 500 of FIG. 5. Signaling is accomplished via SIP and parameters are exchanged using SDP extensions. It is understood that the SIP signaling, specific SIP messages, and the SDP extensions described in the present embodiment are for purposes of example only, and that other SIP messages, SDP fields, signaling protocols, and parameters formats may be used.

In step 1502, the device 102 performs a bridge selection process as previously described. In the present example, the device 102 selects the device 104 as the bridge and the bridge is to be shifted to the device 104 without consultation. In other words, the device 102 has decided to shift the bridge and is instructing the device 104 that it is to be the new bridge. Accordingly, in step 1504, the device 102 sends a SIP message such as a 302 Moved Temporarily to the device 104. The message may contain SDP fields identifying the device 104 as the conference call bridge and the devices 102, 104, and 106 as the conference call participants. In step 1506, the device 104 responds with a message such as a 200 OK. In step 1508, the device 102 sends a similar or identical message to the device 106 and, in step 1510, the device 106 responds with a message such as a 200 OK. In step 1512, the device 104 sets up and bridges the conference call.

Referring to FIG. 16, a sequence diagram illustrates one embodiment of a message sequence 1600 that may occur in the environment of FIG. 1 to shift a conference call bridge with consultation. For example, the sequence 1600 may be used to shift the bridge from the position illustrated in FIG. 3A to the position illustrated in FIG. 3B. Each of the devices 102, 104, and 106 is able to operate as a bridge for the call. For example, the sequence 1600 may be a more specific embodiment of a portion of the sequence 500 of FIG. 5. Signaling is accomplished via SIP and parameters are exchanged using SDP extensions. It is understood that the SIP signaling, specific SIP messages, and the SDP extensions described in the present embodiment are for purposes of example only, and that other SIP messages, SDP fields, signaling protocols, and parameters formats may be used.

In step 1602, the device 102 performs a bridge selection process as previously described. In the present example, the device 102 selects the device 104 as the bridge and the bridge is to be shifted to the device 104 with consultation. In other words, the device 102 has decided to shift the bridge and is requesting that the device 104 allow the shift. Accordingly, in step 1604, the device 102 sends a SIP message such as an UPDATE or INFO to the device 104. It is understood that the device 104 may have previously sent a 180, 183, or similar message to the device 102 as illustrated in step 1406 of FIG. 14, and is waiting for an acknowledgement. Instead, the device 104 receives a message such as an INFO or UPDATE, although other messages (e.g., an INVITE, a 200 OK, or another message) may be used.

The message contains SDP fields identifying the device 104 as the conference call bridge and the devices 102, 104, and 106 as the conference call participants. In step 1606, the device 104 responds with a message such as a 200 OK. In step 1608, the device 102 sends a message such as a 200 OK to the device 104 to acknowledge the shift. In step 1610, the device 102 may send a message such as a 415 Unsupported Media Type or a 480 Temporarily Unavailable to the device 106, which may terminate the session between the devices 102 and 106. In step 1612, the device 104 sets up and bridges the conference call.

Referring to FIG. 17, a sequence diagram illustrates one embodiment of a message sequence 1700 that may occur in the environment of FIG. 1 when a device/network change is detected and the bridge is not shifted. Each of the devices 102, 104, and 106 is able to operate as a bridge for the call. For example, the sequence 1700 may be a more specific embodiment of a portion of the sequence 600 of FIG. 6. Signaling is accomplished via SIP and parameters are exchanged using SDP extensions. It is understood that the SIP signaling, specific SIP messages, and the SDP extensions described in the present embodiment are for purposes of example only, and that other SIP messages, SDP fields, signaling protocols, and parameters formats may be used.

In step 1702, the device 104 detects a device/network change as previously described. In step 1704, the device 104 sends the changed parameters to the device 102 in a message such as a SIP UPDATE message with the changed parameters in SDP. In step 1706, the device 102 selects the bridge. In the present example, the device 102 selects itself as the bridge. In step 1708, the device 102 sends a message such as a 200 OK to the device 104.

If the parameters have changed enough to need updating, the device 102 may send the updated parameters to the device 104 in the 200 OK or in a message such as an UPDATE message. Although not shown, the device 104 may respond to the message of step 1708 with a message such as a 200 OK, particularly if the message included parameter changes. In step 1710, the device 102 may send the updated parameters to the device 106 in a message such as an UPDATE message. It is noted that an UPDATE received during a SIP transaction may have a different meaning than an UPDATE received after the transaction ends. While the transaction is occurring, there is no need to go to the SIP dialog. After the transaction has ended, the dialog is needed. In the present case, the UPDATE of step 1710 is outside of a transaction and within the dialog. Accordingly, the device 106 may recognize the UPDATE as a mid-call transition notifying the device 106 of new session parameters. In step 1712, the device 106 may respond with a message such as a 200 OK. The device 102 may continue to bridge the conference call in step 1714.

Referring to FIG. 18, a sequence diagram illustrates one embodiment of a message sequence 1800 that may occur in the environment of FIG. 1 when a device/network change is detected and the bridge is shifted. Each of the devices 102, 104, and 106 is able to operate as a bridge for the call. For example, the sequence 1800 may be a more specific embodiment of a portion of the sequence 700 of FIG. 7. Signaling is accomplished via SIP and parameters are exchanged using SDP extensions. It is understood that the SIP signaling, specific SIP messages, and the SDP extensions described in the present embodiment are for purposes of example only, and that other SIP messages, SDP fields, signaling protocols, and parameters formats may be used.

Although not shown, prior to step 1802, a message such as an UPDATE message may have occurred after the device 104 detected a device/network change as described with respect to steps 1702 and 1704 of FIG. 17. In step 1802, the device 102 selects the bridge. In the present example, the device 102 selects the device 104 as the bridge. In steps 1804 and 1806, the device 102 sends messages such as BYEs to the devices 104 and 106, respectively, to terminate the sessions. In step 1808, the device 102 may send a message such as an UPDATE message to the device 104 to indicate the bridge shift. In step 1810, the device 104 sets up and bridges the conference call.

Although not shown, in embodiments where the device 102 detects a device/network change related to the device 102, the device 102 may send a message such a REFER to the devices 104 and 106 to forward the sessions. The device 102 may then perform bridge selection and either remain the bridge or transfer the bridge as described previously.

Referring to FIG. 19, one embodiment of a peer-to-peer hybrid system 1900 is illustrated. The system 1900 includes an access server 1902 that is coupled to endpoints 1904 and 1906 (e.g., communication devices 102 and 104 of FIG. 1) via a packet network 1908 (e.g., a part or all of the network 108). Communication between the access server 1902, endpoint 1904, and endpoint 1906 is accomplished using predefined and publicly available (i.e., non-proprietary) communication standards or protocols (e.g., those defined by the IETF or the ITU-T). For example, signaling communications (e.g., session setup, management, and teardown) may use a protocol such as SIP, while actual data traffic may be communicated using a protocol such as RTP. As will be seen in the following examples, the use of standard protocols for communication enables the endpoints 1904 and 1906 to communicate with any device that uses the same standards. The communications may include, but are not limited to, voice calls, instant messages, audio and video, emails, and any other type of resource transfer, where a resource represents any digital data. In the following description, media traffic is generally based on UDP, while authentication is based on TCP/IP. However, it is understood that these are used for purposes of example and that other protocols may be used in addition to or instead of UDP and TCP/IP.

Connections between the access server 1902, endpoint 1904, and endpoint 1906 may include wireline and/or wireless communication channels. In the following description, it is understood that the term "direct" means that there is no endpoint or access server in the communication channel(s) between the endpoints 1904 and 1906, or between either endpoint and the access server. Accordingly, the access server 1902, endpoint 1904, and endpoint 1906 are directly connected even if other devices (e.g., routers, firewalls, and other network elements) are positioned between them. In addition, connections to endpoints, locations, or services may be subscription based, with an endpoint only having access if the endpoint has a current subscription. Furthermore, the following description may use the terms "user" and "endpoint" interchangeably, although it is understood that a user may be using any of a plurality of endpoints. Accordingly, if an endpoint logs in to the network, it is understood that the user is logging in via the endpoint and that the endpoint represents the user on the network using the user's identity.

The access server 1902 stores profile information for a user, a session table to track what users are currently online, and a routing table that matches the address of an endpoint to each online user. The profile information includes a "buddy list" for each user that identifies other users ("buddies") that have previously agreed to communicate with the user. Online users on the buddy list will show up when a user logs in, and buddies who log in later will directly notify the user that they are online (as described with respect to FIG. 22). The access server 1902 provides the relevant profile information and routing table to each of the endpoints 1904 and 1906 so that the endpoints can communicate directly with one another. Accordingly, in the present embodiment, one function of the access server 1902 is to serve as a storage location for information needed by an endpoint in order to communicate with other endpoints and as a temporary storage location for requests, voicemails, etc., as will be described later in greater detail.

With additional reference to FIG. 20a, one embodiment of an architecture 2000 for the access server 1902 of FIG. 19 is illustrated. The architecture 2000 includes functionality that may be provided by hardware and/or software, and that may be combined into a single hardware platform or distributed among multiple hardware platforms. For purposes of illustration, the access server in the following examples is described as a single device, but it is understood that the term applies equally to any type of environment (including a distributed environment) in which at least a portion of the functionality attributed to the access server is present.

In the present example, the architecture includes web services 2002 (e.g., based on functionality provided by XML, SOAP, .NET, MONO), web server 2004 (using, for example, Apache or IIS), and database 2006 (using, for example, mySQL or SQLServer) for storing and retrieving routing tables 2008, profiles 2010, and one or more session tables 2012. Functionality for a STUN (Simple Traversal of UDP through NATs (Network Address Translation)) server 2014 is also present in the architecture 2000. As is known, STUN is a protocol for assisting devices that are behind a NAT firewall or router with their packet routing. The architecture 2000 may also include a redirect server 2016 for handling requests originating outside of the system 1900. One or both of the STUN server 2014 and redirect server 2016 may be incorporated into the access server 1902 or may be a standalone device. In the present embodiment, both the server 2004 and the redirect server 2016 are coupled to the database 2006.

Figure 20B:
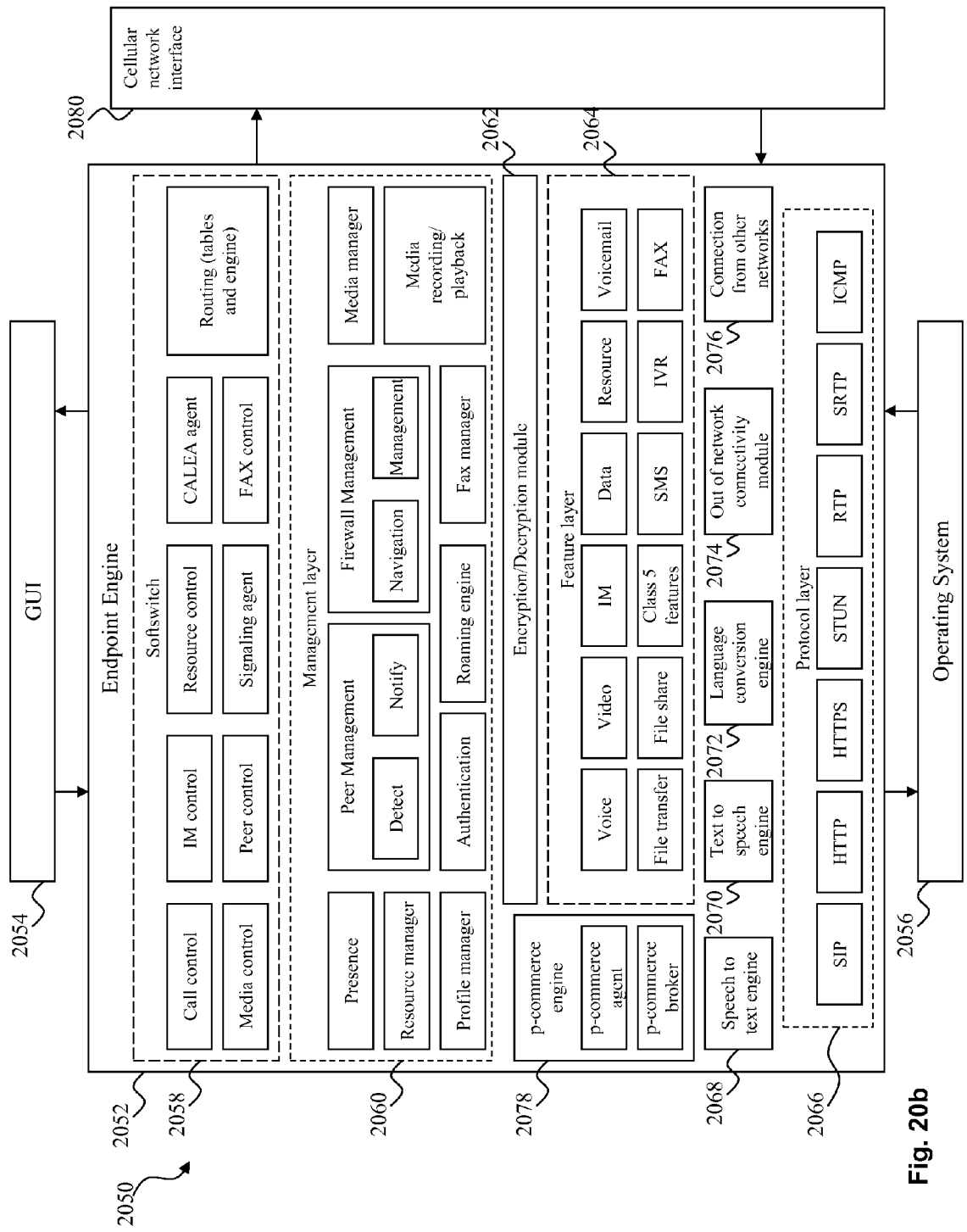
FIG. 20b illustrates one embodiment of an endpoint architecture that may be used within the system of FIG. 19.

Referring to FIG. 20b, one embodiment of an architecture 2050 for the endpoint 1904 (which may be similar or identical to the endpoint 1906) of FIG. 19 is illustrated. It is understood that that term "endpoint" may refer to many different devices having some or all of the described functionality, including a computer, a VoIP telephone, a personal digital assistant, a cellular phone, or any other device having an IP stack upon which the needed protocols may be run. Such devices generally include a network interface, a controller coupled to the network interface, a memory coupled to the controller, and instructions executable by the controller and stored in the memory for performing the functions described in the present application. Data needed by an endpoint may also be stored in the memory. The architecture 2050 includes an endpoint engine 2052 positioned between a graphical user interface (GUI) 2054 and an operating system 2056. The GUI 2054 provides user access to the endpoint engine 2052, while the operating system 2056 provides underlying functionality, as is known to those of skill in the art.

The endpoint engine 2052 may include multiple components and layers that support the functionality required to perform the operations of the endpoint 1904. For example, the endpoint engine 2052 includes a softswitch 2058, a management layer 2060, an encryption/decryption module 2062, a feature layer 2064, a protocol layer 2066, a speech-to-text engine 2068, a text-to-speech engine 2070, a language conversion engine 2072, an out-of-network connectivity module 2074, a connection from other networks module 2076, a p-commerce (e.g., peer commerce) engine 2078 that includes a p-commerce agent and a p-commerce broker, and a cellular network interface module 2080.

Each of these components/layers may be further divided into multiple modules. For example, the softswitch 2058 includes a call control module, an instant messaging (IM) control module, a resource control module, a CALEA (Communications Assistance to Law Enforcement Act) agent, a media control module, a peer control module, a signaling agent, a fax control module, and a routing module.

The management layer 2060 includes modules for presence (i.e., network presence), peer management (detecting peers and notifying peers of being online), firewall management (navigation and management), media management, resource management, profile management, authentication, roaming, fax management, and media playback/recording management.

The encryption/decryption module 2062 provides encryption for outgoing packets and decryption for incoming packets. In the present example, the encryption/decryption module 2062 provides application level encryption at the source, rather than at the network. However, it is understood that the encryption/decryption module 2062 may provide encryption at the network in some embodiments.

The feature layer 2064 provides support for various features such as voice, video, IM, data, voicemail, file transfer, file sharing, class 5 features, short message service (SMS), interactive voice response (IVR), faxes, and other resources. The protocol layer 2066 includes protocols supported by the endpoint, including SIP, HTTP, HTTPS, STUN, RTP, SRTP, and ICMP. It is understood that these are examples only, and that fewer or more protocols may be supported.

The speech-to-text engine 2068 converts speech received by the endpoint (e.g., via a microphone or network) into text, the text-to-speech engine 2070 converts text received by the endpoint into speech (e.g., for output via a speaker), and the language conversion engine 2072 may be configured to convert inbound or outbound information (text or speech) from one language to another language. The out-of-network connectivity module 2074 may be used to handle connections between the endpoint and external devices, and the connection from other networks module 2076 handles incoming connection attempts from external devices. The cellular network interface module 2080 may be used to interact with a wireless network.

With additional reference to FIG. 20c, the cellular network interface module 2080 is illustrated in greater detail. Although not shown in FIG. 20b, the softswitch 2058 of the endpoint architecture 2050 includes a cellular network interface for communication with the cellular network interface module 2080. In addition, the cellular network interface module 2080 includes various components such as a call control module, a signaling agent, a media manager, a protocol stack, and a device interface. It is noted that these components may correspond to layers within the endpoint architecture 2050 and may be incorporated directly into the endpoint architecture in some embodiments.

Figure 20E:
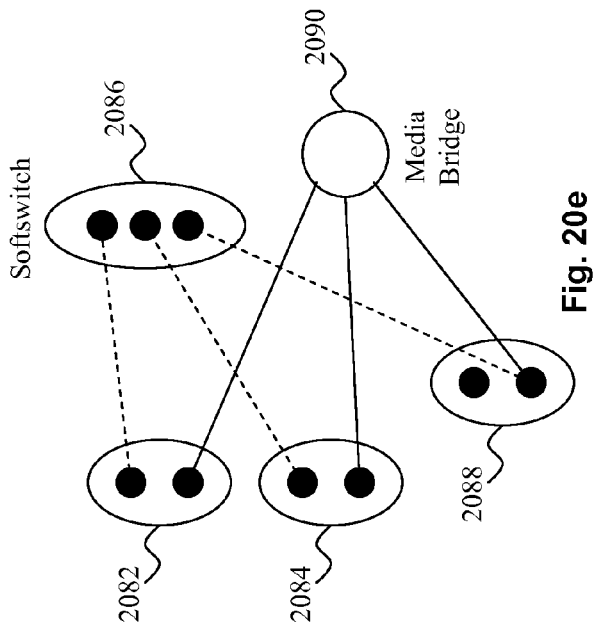
FIG. 20e illustrates a traditional softswitch configuration with three endpoints and a media bridge.
Figure 20D:
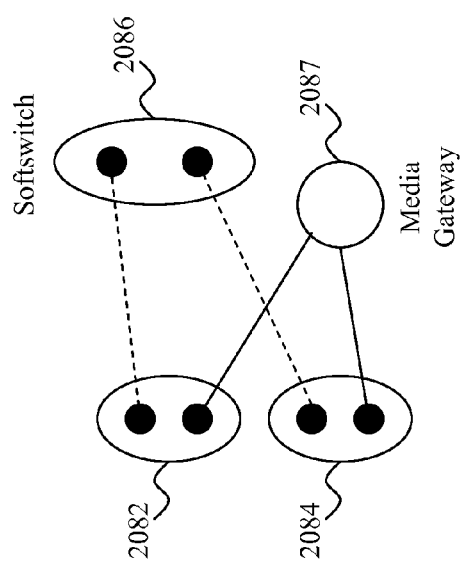
FIG. 20d illustrates a traditional softswitch configuration with two endpoints.

Referring to FIG. 20d, a traditional softswitch architecture is illustrated with two endpoints 2082 and 2084, neither of which includes a softswitch. In the present example, an external softswitch 2086 maintains a first signaling leg (dotted line) with the endpoint 2082 and a second signaling leg (dotted line) with the endpoint 2084. The softswitch 2086 links the two legs to pass signaling information between the endpoints 2082 and 2084. Media traffic (solid lines) may be transferred between the endpoints 2082 and 2084 via a media gateway 2087.

With additional reference to FIG. 20e, the traditional softswitch architecture of FIG. 20d is illustrated with a third endpoint 2088 that also does not include a softswitch. The external softswitch 2086 now maintains a third signaling leg (dotted line) with the endpoint 2088. In the present example, a conference call is underway. However, as none of the endpoints includes a softswitch, a media bridge 2090 connected to each endpoint is needed for media traffic. Accordingly, each endpoint has at most two concurrent connections—one with the softswitch for signaling and another with the media bridge for media traffic.

Figure 20G:
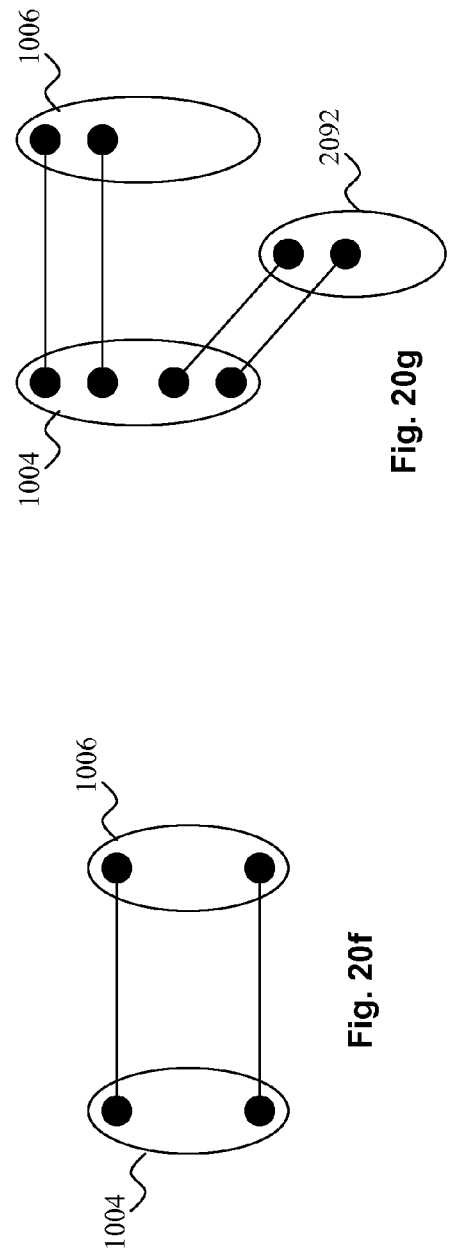
FIG. 20g illustrates one embodiment of the present disclosure with three endpoints, each of which includes a softswitch.
Figure 20F:
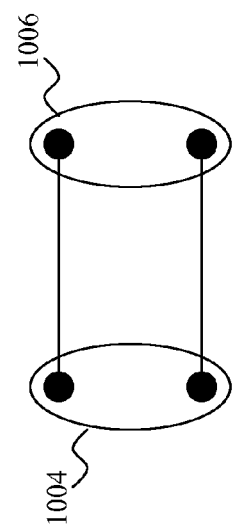
FIG. 20f illustrates one embodiment of the present disclosure with two endpoints, each of which includes a softswitch.

Referring to FIG. 20f, in one embodiment, unlike the traditional architecture of FIGS. 20d and 20e, two endpoints (e.g., the endpoints 1904 and 1906 of FIG. 19) each include a softswitch (e.g., the softswitch 2058 of FIG. 20b). Each endpoint is able to establish and maintain both signaling and media traffic connections (both virtual and physical legs) with the other endpoint. Accordingly, no external softswitch is needed, as this model uses a distributed softswitch method to handle communications directly between the endpoints.

With additional reference to FIG. 20g, the endpoints 1904 and 1906 are illustrated with another endpoint 2092 that also contains a softswitch. In this example, a conference call is underway with the endpoint 1904 acting as the host. To accomplish this, the softswitch contained in the endpoint 1904 enables the endpoint 1904 to support direct signaling and media traffic connections with the endpoint 2092. The endpoint 1904 can then forward media traffic from the endpoint 1906 to the endpoint 2092 and vice versa. Accordingly, the endpoint 1904 may support multiple connections to multiple endpoints and, as in FIG. 20f, no external softswitch is needed.

Referring again to FIG. 20b, in operation, the softswitch 2058 uses functionality provided by underlying layers to handle connections with other endpoints and the access server 1902, and to handle services needed by the endpoint 1904. For example, as is described below in greater detail with respect to FIGS. 21a and 21b, incoming and outgoing calls may utilize multiple components within the endpoint architecture 2050.

Figure 21A:
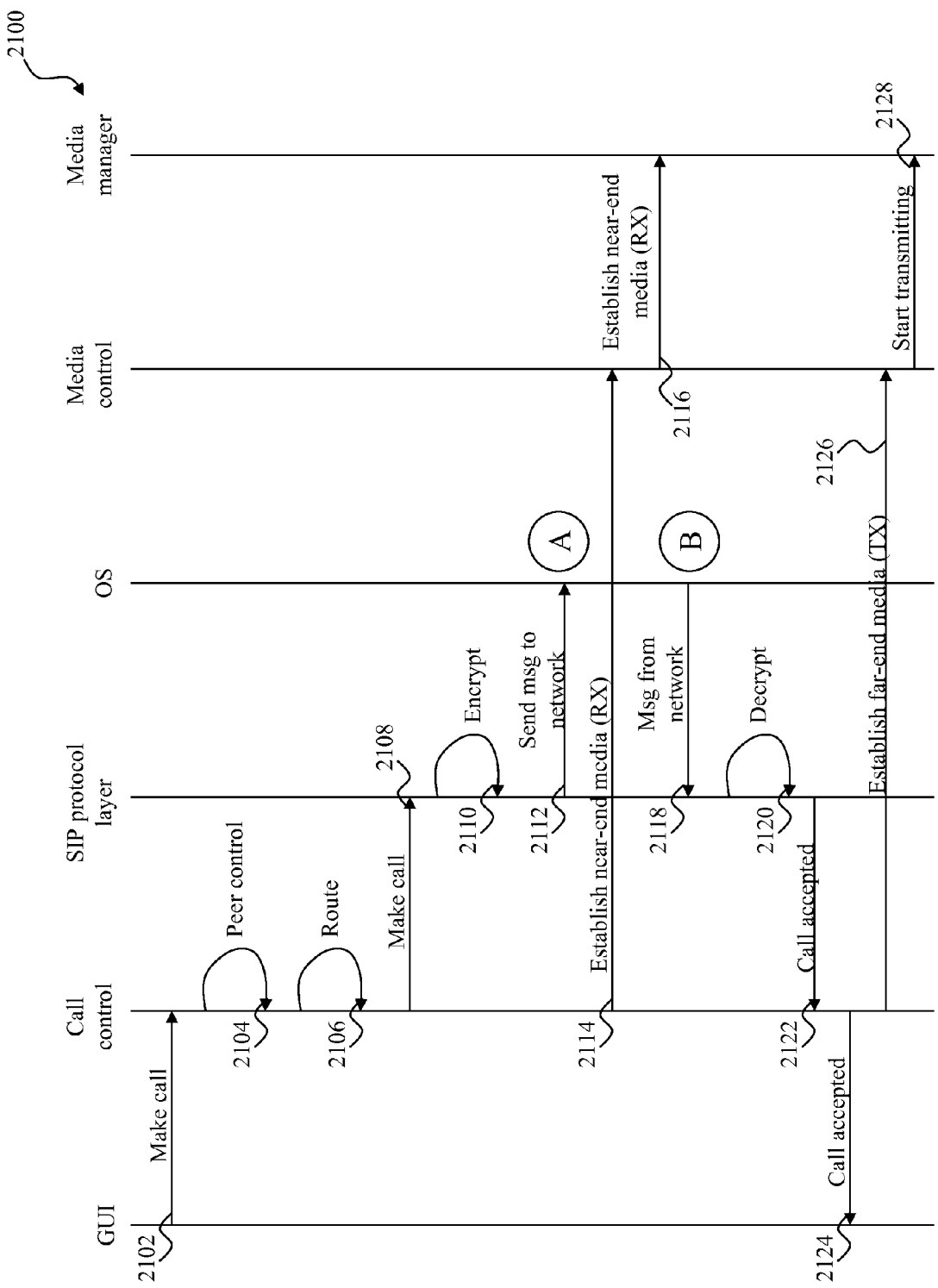
FIG. 21a is a sequence diagram illustrating the interaction of various components of FIG. 20b when placing a call.

Referring to FIG. 21a, a sequence diagram 2100 illustrates an exemplary process by which the endpoint 1904 may initiate a call to the endpoint 1906 using various components of the architecture 2050. Prior to step 2102, a user (not shown) initiates a call via the GUI 2054. In step 2102, the GUI 2054 passes a message to the call control module (of the softswitch 2058) to make the call. The call control module contacts the peer control module (softswitch 2058) in step 2104, which detects the peer (if not already done), goes to the routing table (softswitch 2058) for the routing information, and performs similar operations. It is understood that not all interactions are illustrated. For example, the peer control module may utilize the peer management module (of the management layer 2060) for the peer detection. The call control module then identifies a route for the call in step 2106, and sends message to the SIP protocol layer (of the protocol layer 2066) to make the call in step 2108. In step 2110, the outbound message is encrypted (using the encryption/decryption module 2062) and the message is sent to the network via the OS 2056 in step 2112.

After the message is sent and prior to receiving a response, the call control module instructs the media control module (softswitch 2058) to establish the needed near-end media in step 2114. The media control module passes the instruction to the media manager (of the management layer 2060) in step 2116, which handles the establishment of the near-end media.

Figure 21B:
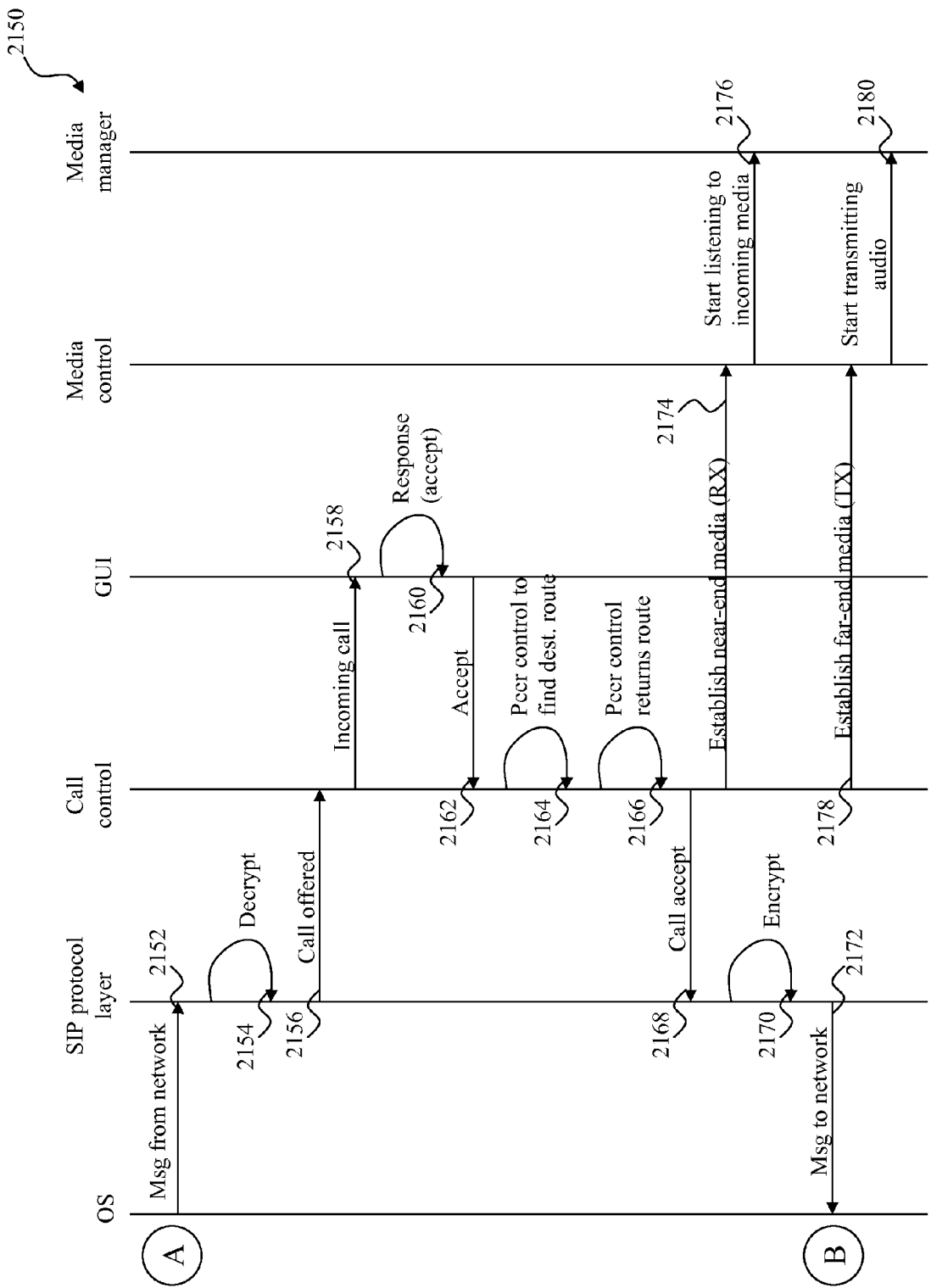
FIG. 21b is a sequence diagram illustrating the interaction of various components of FIG. 20b when receiving a call.

With additional reference to FIG. 21b, the message sent by the endpoint 1904 in step 2112 (FIG. 21a) is received by the endpoint 1906 and passed from the OS to the SIP protocol layer in step 2152. The message is decrypted in step 2154 and the call is offered to the call control module in step 2156. The call control module notifies the GUI of an incoming call in step 2158 and the GUI receives input identifying whether the call is accepted or rejected (e.g., by a user) in step 2160. In the present example, the call is accepted and the GUI passes the acceptance to the call control module in step 2162. The call control module contacts the peer control module in step 2164, which identifies a route to the calling endpoint and returns the route to the call control module in step 2166. In steps 2168 and 2170, the call control module informs the SIP protocol layer that the call has been accepted and the message is encrypted using the encryption/decryption module. The acceptance message is then sent to the network via the OS in step 2172.

In the present example, after the call control module passes the acceptance message to the SIP protocol layer, other steps may occur to prepare the endpoint 1906 for the call. For example, the call control module instructs the media control module to establish near-end media in step 2174, and the media control module instructs the media manager to start listening to incoming media in step 2176. The call control module also instructs the media control module to establish far-end media (step 2178), and the media control module instructs the media manager to start transmitting audio in step 2180.

Returning to FIG. 21*a*, the message sent by the endpoint 1906 (step 2172) is received by the OS and passed on to the SIP protocol layer in step 2118 and decrypted in step 2120. The message (indicating that the call has been accepted) is passed to the call control module in step 2122 and from there to the GUI in step 2124. The call control module then instructs the media control module to establish far-end media in step 2126, and the media control module instructs the media manager to start transmitting audio in step 2128.

The following figures are sequence diagrams that illustrate various exemplary functions and operations by which the access server 1902 and the endpoints 1904 and 1906 may communicate. It is understood that these diagrams are not exhaustive and that various steps may be excluded from the diagrams to clarify the aspect being described.

Figure 22:
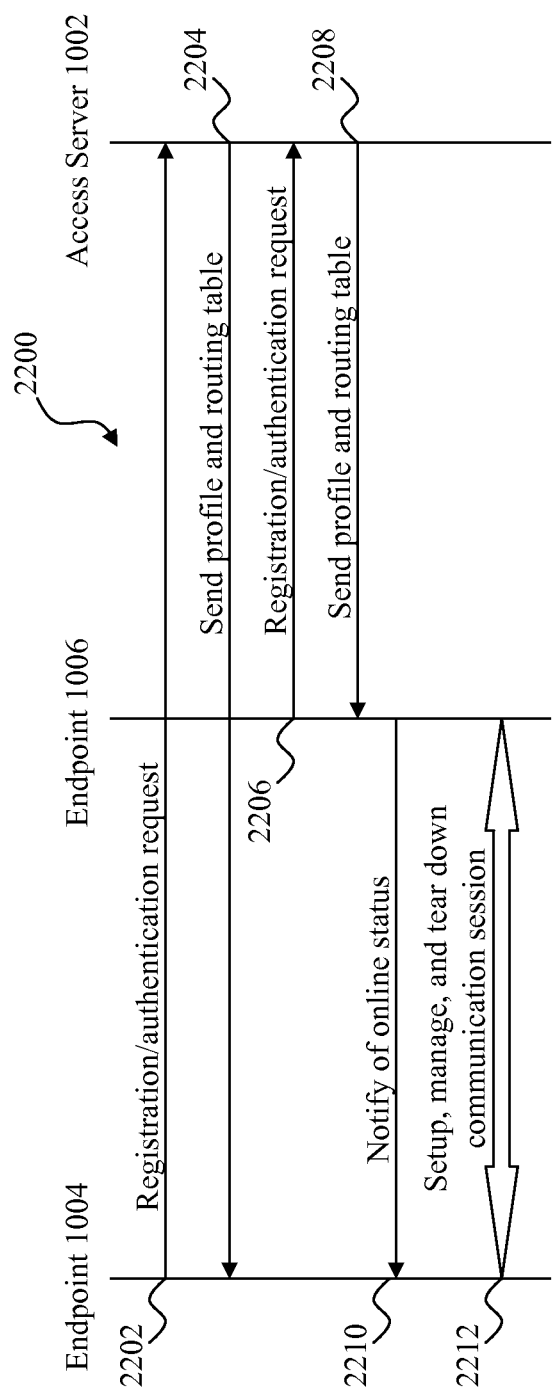
FIG. 22 is a sequence diagram illustrating an exemplary process by which an endpoint of FIG. 19 may be authenticated and communicate with another endpoint.

Referring to FIG. 22 (and using the endpoint 1904 as an example), a sequence diagram 2200 illustrates an exemplary process by which the endpoint 1904 may authenticate with the access server 1902 and then communicate with the endpoint 1906. As will be described, after authentication, all communication (both signaling and media traffic) between the endpoints 1904 and 1906 occurs directly without any intervention by the access server 1902. In the present example, it is understood that neither endpoint is online at the beginning of the sequence, and that the endpoints 1904 and 1906 are "buddies." As described above, buddies are endpoints that have both previously agreed to communicate with one another.

In step 2202, the endpoint 1904 sends a registration and/or authentication request message to the access server 1902. If the endpoint 1904 is not registered with the access server 1902, the access server will receive the registration request (e.g., user ID, password, and email address) and will create a profile for the endpoint (not shown). The user ID and password will then be used to authenticate the endpoint 1904 during later logins. It is understood that the user ID and password may enable the user to authenticate from any endpoint, rather than only the endpoint 1904.

Upon authentication, the access server 1902 updates a session table residing on the server to indicate that the user ID currently associated with the endpoint 1904 is online. The access server 1902 also retrieves a buddy list associated with the user ID currently used by the endpoint 1904 and identifies which of the buddies (if any) are online using the session table. As the endpoint 1906 is currently offline, the buddy list will reflect this status. The access server 1902 then sends the profile information (e.g., the buddy list) and a routing table to the endpoint 1904 in step 2204. The routing table contains address information for online members of the buddy list. It is understood that steps 2202 and 2204 represent a make and break connection that is broken after the endpoint 1904 receives the profile information and routing table.

In steps 2206 and 2208, the endpoint 1906 and access server 1902 repeat steps 2202 and 2204 as described for the endpoint 1904. However, because the endpoint 1904 is online when the endpoint 1906 is authenticated, the profile information sent to the endpoint 1906 will reflect the online status of the endpoint 1904 and the routing table will identify how to directly contact it. Accordingly, in step 2210, the endpoint 1906 sends a message directly to the endpoint 1904 to notify the endpoint 1904 that the endpoint 1906 is now online. This also provides the endpoint 1904 with the address information needed to communicate directly with the endpoint 1906. In step 2212, one or more communication sessions may be established directly between the endpoints 1904 and 1906.

Additional details of endpoints and endpoint functionality, including routing and NAT traversal functionality that may be used to establish and maintain a sharing session as described herein, are provided in U.S. Pat. No. 7,656,870, filed on Mar. 15, 2005, and entitled SYSTEM AND METHOD FOR PEER-TO-PEER HYBRID COMMUNICATIONS; U.S. Pat. No. 7,570,636, filed on Aug. 30, 2005, and entitled SYSTEM AND METHOD FOR TRAVERSING A NAT DEVICE FOR PEER-TO-PEER HYBRID COMMUNICATIONS; and U.S. patent application Ser. No. 12/705,925, filed on Feb. 15, 2010, and entitled SYSTEM AND METHOD FOR STRATEGIC ROUTING IN A PEER-TO-PEER ENVIRONMENT, as previously incorporated by reference in their entirety.

Accordingly, described above are embodiments illustrating how a conference call bridge may be transferred between communication devices, one or more of which may be an endpoint in a peer-to-peer network.

In another embodiment, a method for selecting a communication device as a bridge for a conference call comprises sending, by a first communication device, a first request for a first communication session to a second communication device and a second request for a second communication session to a third communication device; receiving, by the first communication device, a first set of parameters identifying media, device, and network capabilities of the second communication device and a second set of parameters identifying media, device, and network capabilities of the third communication device; determining, by the first communication device, which of the first, second, and third communication devices is to serve as the bridge for the conference call between the first, second, and third communication devices based on the device and network parameters identified in the first and second sets of parameters and a third set of parameters identifying device and network capabilities of the first communication device; sending, by the first communication device, first session parameters for the first communication session to the second communication device and second session parameters for the second communication session to the third communication device if the first communication device determines that the first communication device is to operate as the bridge, wherein the first and second session parameters contain media parameters to be used for the first and second communication sessions, respectively; establishing, by the first communication device, the first communication session with the second communication device based on the first session parameters and the second communication session with the third communication device based on the second session parameters; and bridging, by the first communication device, the first and second communication sessions to provide the conference call for the first, second, and third communication devices. The method may further comprise selecting, by the first communication device, the second communication device as the bridge if the first communication device determines that the second communication device should be the bridge based on the device and network parameters identified in the first, second, and third sets of parameters; and transferring, by the first communication device, the bridge to the second communication device if the second communication device is selected as the bridge. The transferring may include sending, by the first communication device, a message to the second communication device that the second communication device is to be the bridge; and sending, by the first communication device, a message to the third communication device that the second communication session is being closed. The determining, by the first communication device, which of the first, second, and third communication devices is to serve as the bridge for the conference call may include comparing at least one of a processing capability, an available memory, and an available network bandwidth of the first, second, and third communication devices to identify which of the first, second, and third communication devices has at least one of the highest processing capability, the most available memory, and the most available network bandwidth. The determining, by the first communication device, which of the first, second, and third communication devices is to serve as the bridge for the conference call may include selecting the second communication device as the bridge only if the second communication device has the highest processing capability, the most available memory, and the most available network bandwidth compared to the first and third communication devices. The method may further comprise receiving, by the first communication device, a message from the second communication device indicating a change in at least one of the device and network capabilities of the second communication device; and re-determining, by the first communication device, which of the first and second communication devices is to serve as the bridge for the conference call based on the change in the at least one of the device and network capabilities of the second communication device. The method may further comprise transferring, by the first communication device, the bridge to the second communication device if the re-determining identifies that the second communication device should serve as the bridge. The method may further comprise detecting, by the first communication device, a change in at least one of the device and network capabilities of the first communication device; and re-determining, by the first communication device, which of the first, second, and third communication devices is to serve as the bridge for the conference call based on the change in the at least one of the device and network capabilities of the first communication device. The method may further comprise transferring, by the first communication device, the bridge to the second communication device if the re-determining identifies that the second communication device should serve as the bridge. The method may further comprise selecting the first and second session parameters based on the media capabilities of the first, second, and third communication devices, wherein the first and second session parameters are normalized to a single set of session parameters that can be used with both the second and third communication devices. The method may further comprise selecting the first and second session parameters based on the media capabilities of the first, second, and third communication devices, wherein the first session parameters are optimized for the second communication device and the second session parameters are optimized for the third communication device. The media parameters may include at least one of an audio codec and a video codec supported by each of the second and third communication devices. The method may further comprise receiving, by the first communication device, a request from a fourth communication device to join the conference call; receiving, by the first communication device, a fourth set of parameters identifying media, device, and network capabilities of the fourth communication device; and re-determining, by the first communication device, which of the first, second, third, and fourth communication devices is to serve as the bridge for the conference call based on the first, second, third, and fourth sets of parameters. The method may further comprise transferring, by the first communication device, the bridge to the fourth communication device if the re-determining identifies that the fourth communication device should serve as the bridge. The method may further comprise receiving, by the first communication device, a request from a fourth communication device to join the conference call, wherein the fourth communication device is not configured to serve as a bridge; and adding, by the first communication device, the fourth communication to the conference call without re-determining which of the first, second, third, and fourth communication devices is to serve as the bridge. The first request may contain media options available on the first communication device for the first communication session. The first request may be a Session Initiation Protocol message and the media options are in a Session Description Protocol (SDP) format. The first and second communication devices may be peer-to-peer devices that communicate directly with each other and wherein the method may further comprise establishing, by the first communication device, a peer-to-peer session with the second communication device prior to sending the first request.

In still another embodiment, a method for use by a first communication device comprises receiving, by a first communication device, a request for a communication session from a second communication device, wherein the communication session is for a conference call and the request identifies the second communication device and a third communication device as participants in the conference call; sending, by the first communication device, media, device, and network parameters of the first communication device to the second communication device; receiving, by the first communication device, a notification from the second communication device, wherein the notification informs the first communication device that the first communication device is to serve as a conference call bridge for the conference call; establishing, by the first communication device, a first communication session with the first communication device and a second communication session with the third communication device in response to the notification; and bridging, by the first communication device, the first and second communication sessions to provide the conference call for the first, second, and third communication devices. The method may further comprise determining, by the first communication device, which of the first, second, and third communication devices is to serve as the bridge for the conference call between the first, second, and third communication devices based on device and network parameters of each of the first, second, and third communication devices. The determining, by the first communication device, which of the first, second, and third communication devices is to serve as the bridge for the conference call may include comparing at least one of a processing capability, an available memory, and an available network bandwidth of the first, second, and third communication devices to identify which of the first, second, and third communication devices has at least one of the highest processing capability, the most available memory, and the most available network bandwidth. The establishing, by the first communication device, the first and second communication sessions may include: sending a first request to the second communication device for the first communication session and a second request to the third communication device for the second communication session; receiving media parameters from each of the second and third communication devices; and selecting session parameters for the first communication session based on the media parameters received from the second communication device and session parameters for the second communication session based on the media parameters received from the third communication device. The method may further comprise detecting, by the first communication device, a change in at least one of the device and network capabilities of the first communication device; and re-determining, by the first communication device, which of the first, second, and third communication devices is to serve as the bridge for the conference call based on the change in the at least one of the device and network capabilities of the first communication device. The method may further comprise transferring, by the first communication device, the bridge to the second communication device if the re-determining identifies that the second communication device should serve as the bridge.

In yet another embodiment, a communication device comprises a network interface; a processor coupled to the network interface; and a memory coupled to the processor and containing a plurality of instructions for execution by the processor, the instructions including instructions for sending a first request for a first communication session to a second communication device and a second request for a second communication session to a third communication device; receiving a first set of parameters identifying media, device, and network capabilities of the second communication device and a second set of parameters identifying media, device, and network capabilities of the third communication device; determining which of the first, second, and third communication devices is to serve as the bridge for the conference call between the first, second, and third communication devices based on the device and network parameters identified in the first and second sets of parameters; selecting the second communication device as the bridge if the first communication device determines that the second communication device should be the bridge based on the device and network parameters identified in the first and second sets of parameters; transferring the bridge to the second communication device if the second communication device is selected as the bridge; establishing a first communication session with the second communication device based on the media capabilities identified in the first set of parameters and a second communication session with the third communication device based on the media capabilities identified in the second set of parameters if the first communication device determines that the first communication device is to operate as the bridge; and bridging the first and second communication sessions to provide the conference call for the first, second, and third communication devices.

While the preceding description shows and describes one or more embodiments, it will be understood by those skilled in the art that various changes in form and detail may be made therein without departing from the spirit and scope of the present disclosure. For example, various steps illustrated within a particular sequence diagram or flow chart may be combined or further divided. In addition, steps described in one diagram or flow chart may be incorporated into another diagram or flow chart. Some steps may be performed in an order different from that shown and/or may overlap. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method for selecting a communication device as a bridge for a conference call comprising:
   sending, by a first communication device, a first request for a first communication session to a second communication device and a second request for a second communication session to a third communication device;
   receiving, by the first communication device, a first set of parameters identifying media, device, and network capabilities of the second communication device and a second set of parameters identifying media, device, and network capabilities of the third communication device;
   determining, by the first communication device, which of the first, second, and third communication devices is to serve as the bridge for the conference call between the first, second, and third communication devices based on the device and network capabilities identified in the first and second sets of parameters and a third set of parameters identifying device and network capabilities of the first communication device;
   sending, by the first communication device, first session parameters for the first communication session to the second communication device and second session parameters for the second communication session to the third communication device if the first communication device determines that the first communication device is to operate as the bridge, wherein the first and second session parameters contain media parameters to be used for the first and second communication sessions, respectively;
   establishing, by the first communication device, the first communication session with the second communication device based on the first session parameters and the second communication session with the third communication device based on the second session parameters; and
   bridging, by the first communication device, the first and second communication sessions to provide the conference call for the first, second, and third communication devices.

2. The method of claim 1 further comprising:
   selecting, by the first communication device, the second communication device as the bridge if the first communication device determines that the second communication device should be the bridge based on the device and network capabilities identified in the first, second, and third sets of parameters; and
   transferring, by the first communication device, the bridge to the second communication device if the second communication device is selected as the bridge.

3. The method of claim 2 wherein the transferring includes:
   sending, by the first communication device, a message to the second communication device that the second communication device is to be the bridge; and
   sending, by the first communication device, a message to the third communication device that the second communication session is being closed.

4. The method of claim 1 wherein the determining, by the first communication device, which of the first, second, and third communication devices is to serve as the bridge for the conference call includes comparing at least one of a processing capability, an available memory, and an available network bandwidth of the first, second, and third communication devices to identify which of the first, second, and third communication devices has at least one of the highest processing capability, the most available memory, and the most available network bandwidth.

5. The method of claim 4 wherein the determining, by the first communication device, which of the first, second, and third communication devices is to serve as the bridge for the conference call includes selecting the second communication device as the bridge only if the second communication device has the highest processing capability, the most available memory, and the most available network bandwidth compared to the first and third communication devices.

6. The method of claim 1 further comprising:
receiving, by the first communication device, a message from the second communication device indicating a change in at least one of the device and network capabilities of the second communication device; and
re-determining, by the first communication device, which of the first and second communication devices is to serve as the bridge for the conference call based on the change in the at least one of the device and network capabilities of the second communication device.

7. The method of claim 6 further comprising transferring, by the first communication device, the bridge to the second communication device if the re-determining identifies that the second communication device should serve as the bridge.

8. The method of claim 1 further comprising:
detecting, by the first communication device, a change in at least one of the device and network capabilities of the first communication device; and
re-determining, by the first communication device, which of the first, second, and third communication devices is to serve as the bridge for the conference call based on the change in the at least one of the device and network capabilities of the first communication device.

9. The method of claim 8 further comprising transferring, by the first communication device, the bridge to the second communication device if the re-determining identifies that the second communication device should serve as the bridge.

10. The method of claim 1 further comprising selecting the first and second session parameters based on the media capabilities of the first, second, and third communication devices, wherein the first and second session parameters are normalized to a single set of session parameters that can be used with both the second and third communication devices.

11. The method of claim 1 further comprising selecting the first and second session parameters based on the media capabilities of the first, second, and third communication devices, wherein the first session parameters are optimized for the second communication device and the second session parameters are optimized for the third communication device.

12. The method of claim 1 wherein the media parameters include at least one of an audio codec and a video codec supported by each of the second and third communication devices.

13. The method of claim 1 further comprising:
receiving, by the first communication device, a request from a fourth communication device to join the conference call;
receiving, by the first communication device, a fourth set of parameters identifying media, device, and network capabilities of the fourth communication device; and
re-determining, by the first communication device, which of the first, second, third, and fourth communication devices is to serve as the bridge for the conference call based on the first, second, third, and fourth sets of parameters.

14. The method of claim 13 further comprising transferring, by the first communication device, the bridge to the fourth communication device if the re-determining identifies that the fourth communication device should serve as the bridge.

15. The method of claim 1 further comprising:
receiving, by the first communication device, a request from a fourth communication device to join the conference call, wherein the fourth communication device is not configured to serve as a bridge; and
adding, by the first communication device, the fourth communication to the conference call without re-determining which of the first, second, third, and fourth communication devices is to serve as the bridge.

16. The method of claim 1 wherein the first request contains media options available on the first communication device for the first communication session.

17. The method of claim 16 wherein the first request is a Session Initiation Protocol message and the media options are in a Session Description Protocol (SDP) format.

18. The method of claim 16 wherein the first and second communication devices are peer-to-peer devices that communicate directly with each other and wherein the method further comprises establishing, by the first communication device, a peer-to-peer session with the second communication device prior to sending the first request.

19. A method for use by a first communication device comprising:
receiving, by a first communication device, a request for a communication session from a second communication device, wherein the communication session is for a conference call and the request identifies the second communication device and a third 5 communication device as participants in the conference call;
sending, by the first communication device, a set of parameters identifying media, device, and network capabilities of the first communication device to the second communication device;
receiving, by the first communication device, a notification from the second communication device,
wherein the notification informs the first communication device that the first communication device is to serve as a conference call bridge for the conference call;
establishing, by the first communication device, a first communication session with the first communication device and a second communication session with the third communication device in response to the notification;
bridging, by the first communication device, the first and second communication sessions to provide the conference call for the first, second, and third communication devices;
detecting, by the first communication device, a change in at least one of the device and network capabilities of the first communication device; and
determining, by the first communication device in response to detecting the change, which of the first, second, and third communication devices is to serve as the bridge for the conference call between the first, second, and third communication devices based on device and network capabilities of each of each of the first, second, and third communication devices.

20. The method of claim 19 wherein the determining, by the first communication device, which of the first, second, and third communication devices is to serve as the bridge for the conference call includes comparing at least one of a processing capability, an available memory, and an available network bandwidth of the first, second, and third communication.

21. The method of claim 19 wherein establishing, by the first communication device, the first and second communication sessions includes:
sending a first request to the second communication device for the first communication session and a second request to the third communication device for the second communication session;
receiving media parameters from each of the second and third communication devices; and selecting session parameters for the first communication session based on the media parameters received from the second communication device and session parameters for the second communication session based on the media parameters received from the third communication device.

22. The method of claim 19 further comprising transferring, by the first communication device, the bridge to the second communication device if the determining identifies that the second communication device should serve as the bridge.

23. A communication device comprising:
a network interface;
a processor coupled to the network interface; and
a memory coupled to the processor and containing a plurality of instructions for execution by the processor, the instructions including instructions for
sending a first request for a first communication session to a second communication device and a second request for a second communication session to a third communication device;
receiving a first set of parameters identifying media, device, and network capabilities of the second communication device and a second set of parameters identifying media, device, and network capabilities of the third communication device;
determining which of the first, second, and third communication devices is to serve as the bridge for the conference call between the first, second, and third communication devices based on the device and network capabilities identified in the first and second sets of parameters;
selecting the second communication device as the bridge if the first communication device determines that the second communication device should be the bridge based on the device and network capabilities identified in the first and second sets of parameters;
transferring the bridge to the second communication device if the second communication device is selected as the bridge;
establishing a first communication session with the second communication device based on the media capabilities identified in the first set of parameters and a second communication session with the third communication device based on the media capabilities identified in the second set of parameters if the first communication device determines that the first communication device is to operate as the bridge; and
bridging the first and second communication sessions to provide the conference call for the first, second, and third communication devices.

* * * * *